(12) United States Patent
Nakao et al.

(10) Patent No.: US 12,453,701 B2
(45) Date of Patent: Oct. 28, 2025

(54) SOLID COMPOSITION CONTAINING AMORPHOUS, POORLY WATER-SOLUBLE MATERIAL, AND METHOD FOR PRODUCING SAME

(71) Applicant: SAN-EI GEN F.F.I., INC., Toyonaka (JP)

(72) Inventors: Tomohiro Nakao, Osaka (JP); Yuki Imai, Osaka (JP)

(73) Assignee: SAN-EI GEN F.F.I., INC., Osaka (JP)

( * ) Notice: Subject to any disclaimer, the term of this patent is extended or adjusted under 35 U.S.C. 154(b) by 737 days.

(21) Appl. No.: 17/638,538

(22) PCT Filed: Aug. 28, 2020

(86) PCT No.: PCT/JP2020/032765
§ 371 (c)(1),
(2) Date: Feb. 25, 2022

(87) PCT Pub. No.: WO2021/040027
PCT Pub. Date: Mar. 4, 2021

(65) Prior Publication Data
US 2023/0040337 A1    Feb. 9, 2023

(30) Foreign Application Priority Data

Aug. 30, 2019  (JP) ................................ 2019-159126
Feb. 13, 2020  (JP) ................................ 2020-022821

(51) Int. Cl.
| A61K 9/16 | (2006.01) |
| A23L 33/105 | (2016.01) |
| A61K 8/02 | (2006.01) |
| A61K 8/35 | (2006.01) |
| A61K 31/12 | (2006.01) |

(52) U.S. Cl.
CPC .......... *A61K 9/1652* (2013.01); *A23L 33/105* (2016.08); *A61K 8/0245* (2013.01); *A61K 8/35* (2013.01); *A61K 9/1682* (2013.01); *A61K 31/12* (2013.01)

(58) Field of Classification Search
None
See application file for complete search history.

(56) References Cited

U.S. PATENT DOCUMENTS

| 5,340,591 | A | 8/1994 | Nakano et al. |
| 10,709,672 | B2 | 7/2020 | Nakao et al. |
| 10,894,058 | B2 | 1/2021 | Umehara et al. |
| 2011/0201680 | A1 | 8/2011 | Xu et al. |
| 2015/0024060 | A1 | 1/2015 | Madhavi et al. |
| 2017/0217927 | A1 | 8/2017 | Shiraki et al. |
| 2017/0239194 | A1* | 8/2017 | Takeuchi ................ A61P 35/00 |
| 2017/0273999 | A1* | 9/2017 | Umehara ............... A61Q 19/10 |
| 2017/0340571 | A1 | 11/2017 | Cha et al. |
| 2018/0289635 | A1 | 10/2018 | Nakao et al. |
| 2021/0008007 | A1 | 1/2021 | Makino et al. |

FOREIGN PATENT DOCUMENTS

| CN | 106619535 | 5/2017 |
| JP | H05-139974 | 6/1993 |
| JP | 105-262642 | 10/1993 |
| JP | 2007-002243 | 1/2007 |
| JP | 2016-049105 | 4/2016 |
| JP | 2018-078860 | 5/2018 |
| JP | 2018-516945 | 6/2018 |
| JP | 2019-123700 | 7/2019 |
| WO | 91/16899 | 11/1991 |
| WO | 2001/095941 | 12/2001 |
| WO | 2010/075663 | 7/2010 |
| WO | 2014/154793 | 10/2014 |
| WO | 2015/174475 | 11/2015 |
| WO | 2016/010093 | 1/2016 |
| WO | 2016/021707 | 2/2016 |
| WO | 2016/108351 | 7/2016 |
| WO | 2016/198576 | 12/2016 |
| WO | WO2017061627 | * 7/2018 |
| WO | 2019/160146 | 8/2019 |

OTHER PUBLICATIONS

Valenti et al. "Amoprhous solid dispersions of curcumin in a poly(ester amide): Antiplasticizing effect on the glass transition and macromolecular relaxation dynamics, and controlled release" International Journal of Pharmaceutics 644 (2023).*
Curcumin Cyrstalline Extra Pure 2024.*
The extended European Search Report of the corresponding European patent application No. 20858780.8, dated Sep. 6, 2023, 14 pages.
International Search Report of PCT/JP2020/032765, Oct. 20, 2020, 8 pages including English translation.
Office Action issued for the corresponding Japanese patent application No. 2020-546188, Oct. 13, 2020, 8 pages including machine translation.
Office Action issued for the corresponding Japanese patent application No. 2020-546188, Nov. 24, 2020, 13 pages including machine translation.

* cited by examiner

*Primary Examiner* — Danah Al-Awadi
(74) *Attorney, Agent, or Firm* — HSML P.C.

(57) ABSTRACT

The present invention provides a solid composition containing an amorphous poorly water-soluble material, and a method for producing the same. The solid composition of the present invention is a solid composition containing an amorphous poorly water-soluble material (1a), hydroxypropylmethyl cellulose (2), and one or more types of water-soluble polysaccharides (3) other than hydroxypropylmethyl cellulose, and is characterized in that an XRD analysis value of the solid composition is 4.0% or less.

4 Claims, 19 Drawing Sheets

[FIG. 1-1]

| MATERIAL | EXAMPLE | | | |
|---|---|---|---|---|
| | 1 | 2 | 3 | 4 |
| CUR RAW MATERIAL (CALCULATED IN TERMS OF CURCUMIN) | 18.75 (17.1) | 18.75 (17.1) | 18.75 (17.1) | 18.75 (17.1) |
| HPMC1 | 56.25 | 56.25 | 56.25 | 56.25 |
| HPMC2 | | | | |
| HPC1 | 10 | | 10 | |
| HPC2 | | | | |
| GUM ARABIC | 15 | 25 | 15 | 25 |
| REDUCED PALATINOSE | | | | |
| POLYSORBATE 80 | | | | |
| λ-CARRAGEENAN | | | | |
| MALTOSE | | | | |
| RAFFINOSE | | | | |
| TOTAL | 100 | 100 | 100 | 100 |
| CURCUMIN CONTENT RESIDUAL RATIO (%) | 90 | 93 | 95 | 92 |
| XRD ANALYSIS CHART (INITIAL STAGE) | [chart] | [chart] | [chart] | [chart] |
| DEGREE OF AMORPHIZATION (XRD ANALYSIS VALUE*EVALUATION) | O/A | O/A | O/A | O/A |
| XRD ANALYSIS CHART (AFTER STORAGE**) | [chart] | [chart] | [chart] | [chart] |
| DEGREE OF AMORPHIZATION (XRD ANALYSIS VALUE*EVALUATION) | O/A | O/A | O/A | O/A |
| CHANGES IN APPEARANCE AFTER STORAGE** | NON | NON | NON | NON |

Note: Example 1 after-storage row shows "PARTIAL CAKING" — correction: the "CHANGES IN APPEARANCE AFTER STORAGE" row for Example 1 is NON.

[FIG. 1-2]

| MATERIAL | | COMPARATIVE EXAMPLE | | | | |
|---|---|---|---|---|---|---|
| | | 1 | 2 | 3 | 4 | 5 |
| CUR RAW MATERIAL | | 18.75 | 18.75 | 18.75 | 25 | 18.75 |
| (CALCULATED IN TERMS OF CURCUMIN) | | (17.1) | (17.1) | (17.1) | (22.8) | (17.1) |
| HPMC1 | | 56.25 | 56.25 | 56.25 | | 56.25 |
| HPMC2 | | | | | | |
| HPC1 | | | | | | |
| GUM ARABIC | | 25 | | | | |
| REDUCED PALATINOSE | | | | | | |
| POLYSORBATE 80 | | | | | | |
| λ-CARRAGEENAN | | | 25 | | | |
| MALTOSE | | | | | 28 | |
| RAFFINOSE | | | | 25 | 47 | 25 |
| TOTAL | | 100 | 100 | 100 | 100 | 100 |
| CURCUMIN CONTENT RESIDUAL RATIO (%) | | 90 | 78 | 102 | 103 | 93 |
| XRD ANALYSIS CHART (INITIAL STAGE) | | 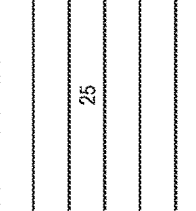 | 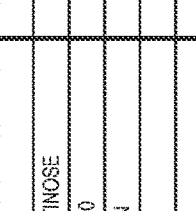 |  | 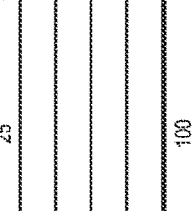 | 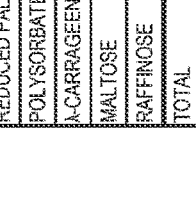 |
| XRD ANALYSIS CHART (AFTER STORAGE**) | | 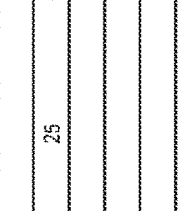 | 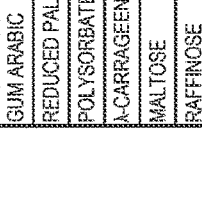 | 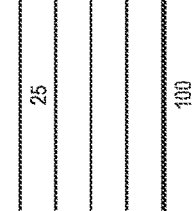 | 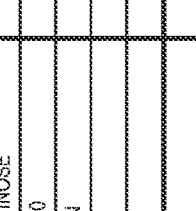 |  |
| CHANGES IN APPEARANCE AFTER STORAGE** | | CAKING | PARTIAL CAKING | CAKING | SOLIDIFICATION | CAKING |

[FIG. 2-1]

| MATERIAL | | EXAMPLE | | | |
|---|---|---|---|---|---|
| | | 5 | 6 | 7 | 8 |
| CUR RAW MATERIAL (CALCULATED IN TERMS OF CURCUMIN) | | 60 (54.7) | 60 (54.7) | 5 (4.6) | 5 (4.6) |
| HPMC1 | | 36 | 36 | 90 | 90 |
| HPC1 | | | 2 | | 2.5 |
| GUM ARABIC | | 4 | 2 | 5 | 2.5 |
| TOTAL | | 100 | 100 | 100 | 100 |
| CURCUMIN CONTENT RESIDUAL RATIO (%) | | 96 | 95 | 95 | 99 |
| XRD ANALYSIS CHART (INITIAL STAGE) | | (chart) | (chart) | (chart) | (chart) |
| DEGREE OF AMORPHIZATION (XRD ANALYSIS VALUE*/EVALUATION) | | O/A | O/A | O/A | O/A |
| XRD ANALYSIS CHART (AFTER STORAGE) | | (chart) | (chart) | (chart) | (chart) |
| DEGREE OF AMORPHIZATION (XRD ANALYSIS VALUE**/EVALUATION) | | O/A | O/A | O/A | O/A |
| CHANGES IN APPEARANCE AFTER STORAGE*** | | CAKING | PARTIAL CAKING | NON | NON |

[FIG. 2-2]

| MATERIAL | EXAMPLE | | | |
|---|---|---|---|---|
| | 9 | 10 | 11 | 12 |
| CUR RAW MATERIAL (CALCULATED IN TERMS OF CURCUMIN) | 7.5 (6.8) | 7.5 (6.8) | 5 (4.6) | 5 (4.6) |
| HPMC1 | 67.5 | 67.5 | 20 | 20 |
| HPC1 | | 10 | 25 | 50 |
| GUM ARABIC | 25 | 15 | 50 | 25 |
| TOTAL | 100 | 100 | 100 | 100 |
| CURCUMIN CONTENT RESIDUAL RATIO (%) | 95 | 99 | 100 | 91 |
| XRD ANALYSIS CHART (INITIAL STAGE) | [chart] | [chart] | [chart] | [chart] |
| DEGREE OF AMORPHIZATION (XRD ANALYSIS VALUE*/EVALUATION) | O/A | O/A | O/A | O/A |
| XRD ANALYSIS CHART (AFTER STORAGE**) | [chart] | [chart] | [chart] | [chart] |
| DEGREE OF AMORPHIZATION (XRD ANALYSIS VALUE*/EVALUATION) | O/A | O/A | O/A | O/A |
| CHANGES IN APPEARANCE AFTER STORAGE** | NON | NON | CAKING | CAKING |

[FIG. 3-1]

| MATERIAL | EXAMPLE | | | |
|---|---|---|---|---|
| | 13 | 14 | 15 | 16 |
| CUR RAW MATERIAL (CALCULATED IN TERMS OF CURCUMIN) | 18.75 (17.1) | 18.75 (17.1) | 18.75 (17.1) | 18.75 (17.1) |
| HPMC1 | 56.25 | 56.25 | 56.25 | 56.25 |
| HPC1 | 10 | | 10 | |
| GUAR GUM DECOMPOSITION PRODUCT | 15 | | | |
| SOYBEAN POLYSACCHARIDE | | 25 | 15 | 25 |
| HM PECTIN | | | | |
| TAMARIND SEED GUM | | | | |
| TOTAL | 100 | 100 | 100 | 100 |
| CURCUMIN CONTENT RESIDUAL RATIO (%) | 99 | 99 | 96 | 91 |
| XRD ANALYSIS CHART (INITIAL STAGE) | [chart] | [chart] | [chart] | [chart] |
| DEGREE OF AMORPHIZATION (XRD ANALYSIS VALUE/EVALUATION) | 0/A | 0/A | 0/A | 0/A |
| XRD ANALYSIS CHART (AFTER STORAGE) | [chart] | [chart] | [chart] | [chart] |
| DEGREE OF AMORPHIZATION (XRD ANALYSIS VALUE/EVALUATION) | 0/A | 0/A | 0/A | 0/A |
| CHANGES IN APPEARANCE AFTER STORAGE** | NON | NON | NON | NON |

[FIG. 3-2]

| MATERIAL | EXAMPLE | | | |
|---|---|---|---|---|
| | 17 | 18 | 19 | 20 |
| CUR RAW MATERIAL (CALCULATED IN TERMS OF CURCUMIN) | 18.75 (17.1) | 18.75 (17.1) | 18.75 (17.1) | 18.75 (17.1) |
| HPMC1 | 56.25 | 56.25 | 56.25 | 56.25 |
| HPC1 | 10 | | 10 | |
| GUAR GUM DECOMPOSITION PRODUCT | | | | |
| SOYBEAN POLYSACCHARIDE | | | | |
| HM PECTIN | 15 | | | |
| TAMARIND SEED GUM | | 25 | 15 | 25 |
| TOTAL | 100 | 100 | 100 | 100 |
| CURCUMIN CONTENT RESIDUAL RATIO (%) | 97 | 99 | 95 | 92 |
| XRD ANALYSIS CHART (INITIAL STAGE) | [chart] | [chart] | [chart] | [chart] |
| DEGREE OF AMORPHIZATION (XRD ANALYSIS VALUE*/EVALUATION) | O/A | O/A | O/A | O/A |
| XRD ANALYSIS CHART (AFTER STORAGE**) | [chart] | [chart] | [chart] | [chart] |
| DEGREE OF AMORPHIZATION (XRD ANALYSIS VALUE*/EVALUATION) | O/A | O/A | O/A | O/A |
| CHANGES IN APPEARANCE AFTER STORAGE** | NON | NON | NON | NON |

[FIG. 3-3]

| MATERIAL | EXAMPLE | | | |
|---|---|---|---|---|
| | 21 | 22 | 23 | 24 |
| CUR RAW MATERIAL (CALCULATED IN TERMS OF CURCUMIN) | 18.75 (17.1) | 18.75 (17.1) | 18.75 (17.1) | 18.75 (17.1) |
| HPMC1 | 56.25 | 56.25 | 56.25 | 56.25 |
| HPC1 | 10 | | 10 | |
| GHATTI GUM | 15 | | | |
| PULLULAN | | 25 | | 25 |
| INDIGESTIBLE DEXTRIN | | | 15 | |
| CMC | | | | |
| TOTAL | 100 | 100 | 100 | 100 |
| CURCUMIN CONTENT RESIDUAL RATIO (%) | 96 | 92 | 93 | 94 |
| XRD ANALYSIS CHART (INITIAL STAGE) | (chart) | (chart) | (chart) | (chart) |
| DEGREE OF AMORPHIZATION (XRD ANALYSIS VALUE*/EVALUATION) | O/A | O/A | O/A | O/A |
| XRD ANALYSIS CHART (AFTER STORAGE) | (chart) | (chart) | (chart) | (chart) |
| DEGREE OF AMORPHIZATION (XRD ANALYSIS VALUE*/EVALUATION) | O/A | O/A | O/A | O/A |
| CHANGES IN APPEARANCE AFTER STORAGE** | NON | NON | NON | NON |

[FIG. 3-4]

| MATERIAL | EXAMPLE | | | |
|---|---|---|---|---|
| | 25 | 26 | 27 | 28 |
| CUR RAW MATERIAL (CALCULATED IN TERMS OF CURCUMIN) | 18.75 (17.1) | 18.75 (17.1) | 18.75 (17.1) | 18.75 (17.1) |
| HPMC1 | 56.25 | 56.25 | 56.25 | 56.25 |
| HPC1 | 10 | | 10 | |
| GHATTI GUM | | | | |
| PULLULAN | | | | |
| INDIGESTIBLE DEXTRIN | 15 | 25 | | |
| CMC | | | 15 | 25 |
| TOTAL | 100 | 100 | 100 | 100 |
| CURCUMIN CONTENT RESIDUAL RATIO (%) | 94 | 90 | 88 | 89 |
| XRD ANALYSIS CHART (INITIAL STAGE) | | | | |
| DEGREE OF AMORPHIZATION (XRD ANALYSIS VALUE*/EVALUATION) | 0/A | 0/A | 0/A | 0/A |
| XRD ANALYSIS CHART (AFTER STORAGE**) | | | | |
| DEGREE OF AMORPHIZATION (XRD ANALYSIS VALUE*/EVALUATION) | 0/A | 0/A | 0/A | 0/A |
| CHANGES IN APPEARANCE AFTER STORAGE** | NON | NON | NON | NON |

[FIG. 3-5]

| MATERIAL | EXAMPLE | | | |
|---|---|---|---|---|
| | 29 | 30 | 31 | 32 |
| CUR RAW MATERIAL (CALCULATED IN TERMS OF CURCUMIN) | 18.75 (17.1) | 18.75 (17.1) | 18.75 (17.1) | 18.75 (17.1) |
| HPMC1 | 56.25 | 56.25 | 56.25 | 56.25 |
| HPC1 | 10 | | 10 | |
| MICROCRYSTALLINE CELLULOSE | 15 | 25 | | |
| FERMENTED CELLULOSE PREPARATION (FERMENTED CELLULOSE CONTENT) | | | 15 (3) | 25 (5) |
| α—CD | | | | |
| γ—CD | | | | |
| PROCESSED STARCH | | | | |
| DEXTRIN | | | | |
| TOTAL | 100 | 100 | 100 | 100 |
| CURCUMIN CONTENT RESIDUAL RATIO (%) | 94 | 95 | 93 | 93 |
| XRD ANALYSIS CHART (INITIAL STAGE) | | | | |
| DEGREE OF AMORPHIZATION (XRD ANALYSIS VALUE/EVALUATION) | O/A | O/A | O/A | O/A |
| XRD ANALYSIS CHART (AFTER STORAGE) | | | | |
| DEGREE OF AMORPHIZATION (XRD ANALYSIS VALUE/EVALUATION) | O/A | O/A | O/A | O/A |
| CHANGES IN APPEARANCE AFTER STORAGE*4 | NON | NON | NON | NON |

[FIG. 3-6]

| MATERIAL | EXAMPLE | | | |
|---|---|---|---|---|
| | 33 | 34 | 35 | 36 |
| CUR RAW MATERIAL (CALCULATED IN TERMS OF CURCUMIN) | 18.75 (17.1) | 18.75 (17.1) | 22.5 (20.5) | 22.5 (20.5) |
| HPMC1 | 56.25 | 56.25 | 52.5 | 52.5 |
| HPC1 | 10 | 10 | | |
| MICROCRYSTALLINE CELLULOSE | | | | |
| FERMENTED CELLULOSE PREPARATION (FERMENTED CELLULOSE CONTENT) | | | | |
| α—CD | 15 | 15 | | |
| γ—CD | | | | |
| PROCESSED STARCH | | | 25 | |
| DEXTRIN | | | | 25 |
| TOTAL | 100 | 101 | 100 | 100 |
| CURCUMIN CONTENT RESIDUAL RATIO (%) | 94 | 90 | 99 | 98 |
| XRD ANALYSIS CHART (INITIAL STAGE) | (chart) | (chart) | (chart) | (chart) |
| DEGREE OF AMORPHIZATION (XRD ANALYSIS VALUE*/EVALUATION) | 0/A | 0/A | 0/A | 0/A |
| XRD ANALYSIS CHART (AFTER STORAGE) | (chart) | (chart) | (chart) | (chart) |
| DEGREE OF AMORPHIZATION (XRD ANALYSIS VALUE*/EVALUATION) | 0/A | 0/A | 0/A | 0.21/A |
| CHANGES IN APPEARANCE AFTER STORAGE** | NON | NON | NON | NON |

[FIG. 3-7]

| MATERIAL | EXAMPLE | |
|---|---|---|
| | 37 | 38 |
| CUR RAW MATERIAL (CALCULATED IN TERMS OF CURCUMIN) | 18.75 (17.1) | 18.75 (17.1) |
| HPMC1 | 56.25 | 56.25 |
| HPC1 | 10 | |
| λ-CARRAGEENAN | 15 | 25 |
| TOTAL | 100 | 100 |
| CURCUMIN CONTENT RESIDUAL RATIO (%) | 98 | 98 |
| XRD ANALYSIS CHART (INITIAL STAGE) | 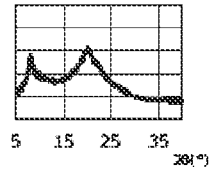 | 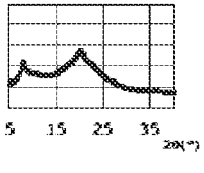 |
| DEGREE OF AMORPHIZATION (XRD ANALYSIS VALUE*/EVALUATION) | 0/A | 0/A |
| XRD ANALYSIS CHART (AFTER STORAGE**) | 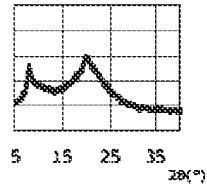 | 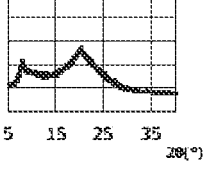 |
| DEGREE OF AMORPHIZATION (XRD ANALYSIS VALUE*/EVALUATION) | 0/A | 0/A |
| CHANGES IN APPEARANCE AFTER STORAGE** | SLIGHT CAKING | CAKING |

[FIG. 4-1]

| MATERIAL | EXAMPLE | | | |
|---|---|---|---|---|
| | 39 | 40 | 41 | 42 |
| SILYMARIN | 22.5 | 22.5 | | |
| LUTEOLIN | | | 15 | 15 |
| HPMC1 | 52.5 | 52.5 | 60 | 60 |
| HPC1 | 10 | | 15 | |
| GUM ARABIC | 15 | 25 | 10 | 25 |
| TOTAL | 100 | 100 | 100 | 100 |
| CONTENT RESIDUAL RATIO OF POORLY WATER-SOLUBLE MATERIAL (%) | 93 | 94 | 95 | 92 |
| XRD ANALYSIS CHART (INITIAL STAGE) | 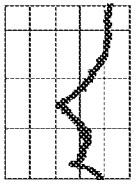 | | | |
| DEGREE OF AMORPHIZATION (XRD ANALYSIS VALUE*/EVALUATION) | 0/A | 0/A | 0.35/A | 0.85/A |
| XRD ANALYSIS CHART (AFTER STORAGE**) | 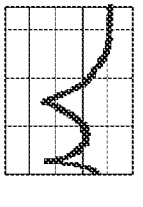 | | | |
| DEGREE OF AMORPHIZATION (XRD ANALYSIS VALUE*/EVALUATION) | 0/A | 0/A | 0.88/A | 0.76/A |
| CHANGES IN APPEARANCE AFTER STORAGE** | NON | NON | NON | NON |

[FIG. 4-2]

| MATERIAL | EXAMPLE | | |
|---|---|---|---|
| | 43 | 44 | 45 |
| RESVERATROL | 18.75 | | 45 |
| NARINGENIN | | 22.5 | |
| HESPERETIN | | | 22.5 |
| HPMC1 | 56.25 | 52.5 | 52.5 |
| HPC1 | | | |
| GUM ARABIC | 25 | 25 | 25 |
| TOTAL | 100 | 100 | 100 |
| CONTENT RESIDUAL RATIO OF POORLY WATER-SOLUBLE MATERIAL (%) | 99 | 87 | 98 |
| XRD ANALYSIS CHART (INITIAL STAGE) | 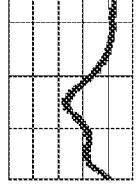 | 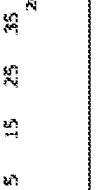 | 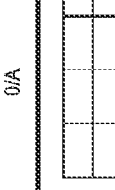 |
| DEGREE OF AMORPHIZATION (XRD ANALYSIS VALUE/EVALUATION) | O/A | O/A | O/A |
| XRD ANALYSIS CHART (AFTER STORAGE**) | 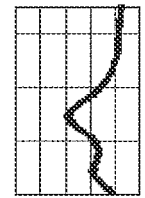 | 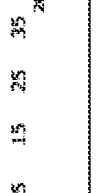 | 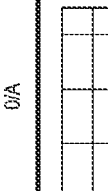 |
| DEGREE OF AMORPHIZATION (XRD ANALYSIS VALUE/EVALUATION) | O/A | O/A | O/A |
| CHANGES IN APPEARANCE AFTER STORAGE** | NON | PARTIAL CAKING | PARTIAL CAKING |

[FIG. 4-3]

| MATERIAL | EXAMPLE | | |
|---|---|---|---|
| | 46 | 47 | 48 |
| PMF | 22.5 | 22.5 | 48 |
| CHOLECALCIFEROL | | | 20 |
| HPMC1 | 52.5 | 52.5 | 20 |
| HPC1 | 10 | | 50 |
| GUM ARABIC | 15 | 25 | 10 |
| POLYSORBATE 80 | | | |
| TOTAL | 100 | 100 | 100 |
| CONTENT RESIDUAL RATIO OF POORLY WATER-SOLUBLE MATERIAL (%) | 107 | 106 | — |
| XRD ANALYSIS CHART (INITIAL STAGE) | [chart] | [chart] | [chart] |
| DEGREE OF AMORPHIZATION (XRD ANALYSIS VALUE*/EVALUATION) | O/A | O/A | O/A |
| XRD ANALYSIS CHART (AFTER STORAGE**) | [chart] | [chart] | |
| DEGREE OF AMORPHIZATION (XRD ANALYSIS VALUE*/EVALUATION) | O/A | O/A | — |
| CHANGES IN APPEARANCE AFTER STORAGE** | CAKING | CAKING | — |

[FIG. 4-4]

| MATERIAL | EXAMPLE | EXAMPLE | COMPARATIVE EXAMPLE |
|---|---|---|---|
| ASTAXANTHIN | 49 | 50 | 6 |
| SESAMIN | 22.5 | 10.99 | 10.99 |
| HPMC1 | 52.5 | 64.01 | 64.01 |
| HPC1 | | 10 | |
| GUM ARABIC | 25 | 15 | |
| POLYSORBATE 80 | | | 25 |
| TOTAL | 100 | 100 | 100 |
| CONTENT RESIDUAL RATIO OF POORLY WATER-SOLUBLE MATERIAL (%) | 99 | 76 | 46 |
| XRD ANALYSIS CHART (INITIAL STAGE) | 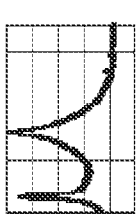 | 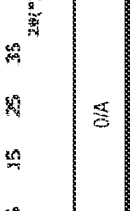 | 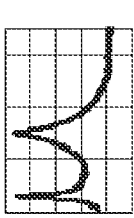 |
| DEGREE OF AMORPHIZATION (XRD ANALYSIS VALUE*/EVALUATION) | 0/A | 0.6/A | 0/A |
| XRD ANALYSIS CHART (AFTER STORAGE) | 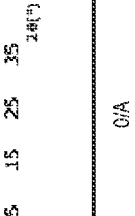 | | |
| DEGREE OF AMORPHIZATION (XRD ANALYSIS VALUE*/EVALUATION) | 2.4/B | 0.75/A | 0/A |
| CHANGES IN APPEARANCE AFTER STORAGE** | CAKING | NON | YELLOWING |

[FIG. 5]
| MATERIAL (g) | COMPARATIVE EXAMPLE 7 | COMPARATIVE EXAMPLE 8 |
|---|---|---|
| CUR RAW MATERIAL (CALCULATED IN TERMS OF CURCUMIN) | 4.5 (4.1) | 4.5 (4.1) |
| HPMC1 | | 4.5 |
| HPMC2 | 4.5 | |
| DEXTRIN | 18 | 18 |
| TOTAL (g) | 27 | 27 |
| XRD ANALYSIS CHART (INITIAL STAGE) | 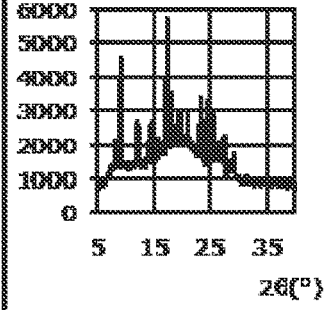 | 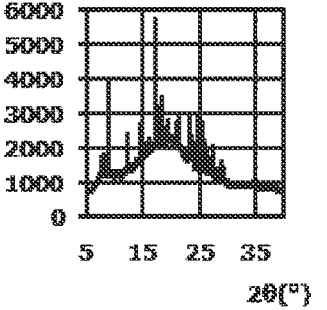 |
| XRD ANALYSIS VALUE* | 20 | 13.1 |
| EVALUATION OF AMORPHIZATION | C | C |

[FIG. 6]

| | COMPARATIVE EXAMPLE 9 | COMPARATIVE EXAMPLE 10 | COMPARATIVE EXAMPLE 11 | COMPARATIVE EXAMPLE 12 |
|---|---|---|---|---|
| CUR RAW MATERIAL (CALCULATED IN TERMS OF CURCUMIN) | 27.5 (25.1) | 27.5 (25.1) | 69 (62.9) | 100 (91.2) |
| HPMC1 | 55 | | | |
| HPMC2 | | 55 | 14 | |
| HPMC3 | | | | |
| DEXTRIN | 17.5 | 17.5 | 17 | |
| TOTAL | 100 | 100 | 100 | 100 |
| XRD ANALYSIS CHART (INITIAL STAGE) | graph 5–35 2θ(°) | graph 5–35 2θ(°) | graph 5–35 2θ(°) | graph 5–35 2θ(°) |
| DEGREE OF AMORPHIZATION (XRD ANALYSIS VALUE*/EVALUATION) | 4.9/C | 4.8/C | 10.9/C | 15.7/C |
| XRD ANALYSIS CHART (AFTER STORAGE) | graph 5–35 2θ(°) | graph 5–35 2θ(°) | graph 5–35 2θ(°) | graph 5–35 2θ(°) |
| STORAGE CONDITIONS | 60°C, 1 MONTH | 60°C, 2 WEEKS | 60°C, 2 WEEKS | 40°C, 1 MONTH IN ALUMINUM VAPOR DEPOSITION BAG |
| DEGREE OF AMORPHIZATION (XRD ANALYSIS VALUE*/EVALUATION) | 4.7/C | 5.1/C | 12.0/C | 16.7/C |
| CHANGES IN APPEARANCE AFTER STORAGE | NO GREAT DIFFERENCE | NO GREAT DIFFERENCE | NO GREAT DIFFERENCE | NO GREAT DIFFERENCE |

[FIG. 7-1]
| MATERIAL (g) | TEST SAMPLE 1 | TEST SAMPLE 2 | TEST SAMPLE 3 | TEST SAMPLE 4 | TEST SAMPLE 5 |
|---|---|---|---|---|---|
| CUR AMORPHOUS PREPARATION (EXAMPLE 49) (CALCULATED IN TERMS OF AMORPHOUS CUR) | 5 (1) | 5 (1) | 2.5 (0.5) | 2 (0.4) | 1 (0.2) |
| CUR RAW MATERIAL (CALCULATED IN TERMS OF CRYSTALLINE CUR) | 0.29 (0.26) | 1.09 (1) | 2.73 (2.49) | 4.37 (3.99) | 5.47 (4.99) |
| TOTAL (g) | 5.29 | 6.09 | 5.23 | 6.37 | 6.47 |
| XRD ANALYSIS CHART (INITIAL STAGE) | 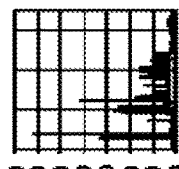 | 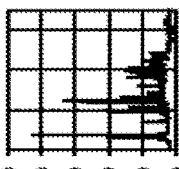 | 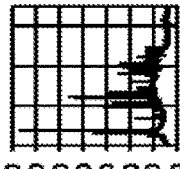 | 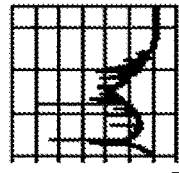 | 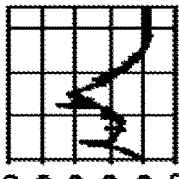 |
| XRD ANALYSIS VALUE* | 4 | 15.5 | 40.8 | 53.8 | 68.6 |

[FIG. 7-2]
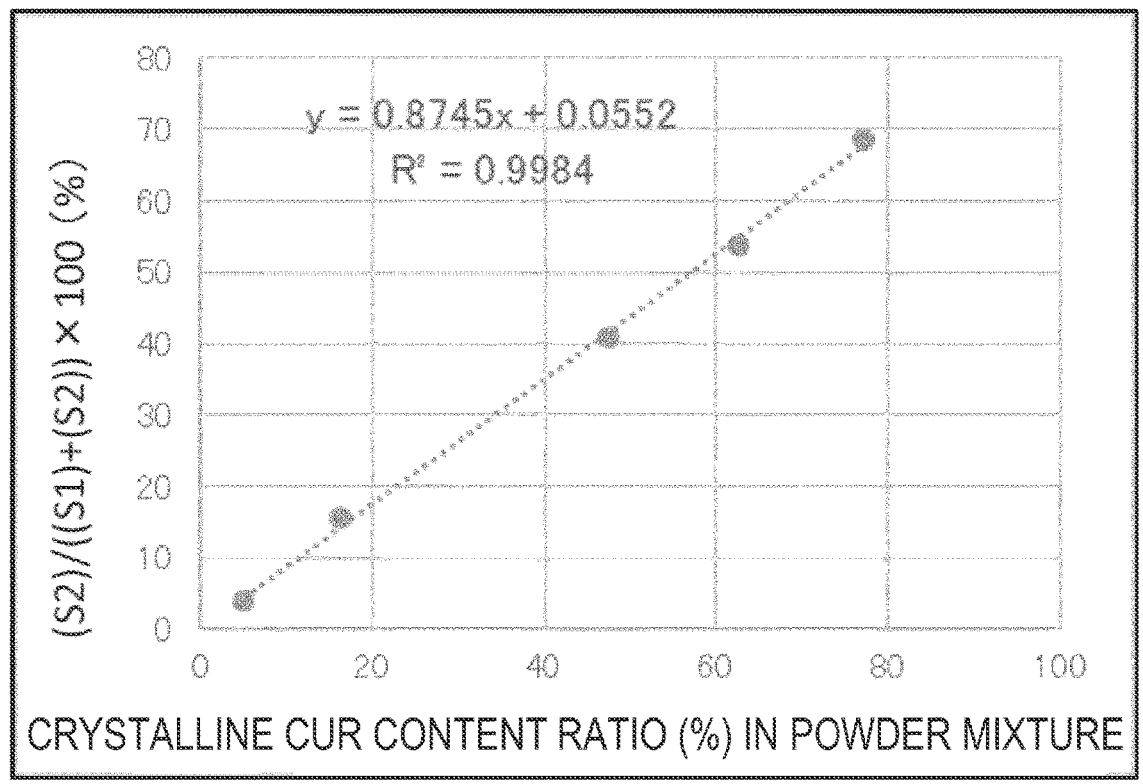
[FIG. 7-3]
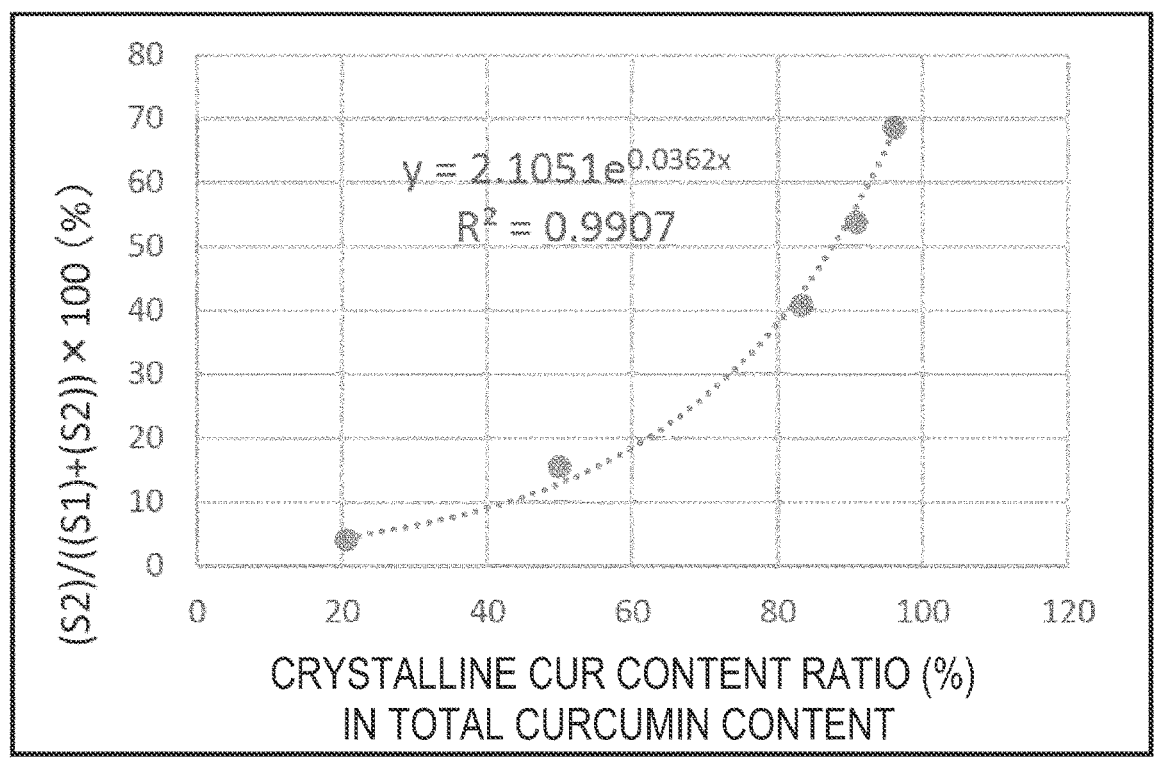

SOLID COMPOSITION CONTAINING AMORPHOUS, POORLY WATER-SOLUBLE MATERIAL, AND METHOD FOR PRODUCING SAME

TECHNICAL FIELD

The present disclosure relates to a solid composition containing an amorphous poorly water-soluble material, a method for producing the same, and the like. The present disclosure also relates to a method for determining the proportion of a crystalline material and/or an amorphous material in a poorly water-soluble material contained in the solid composition.

CROSS REFERENCE OF RELATED APPLICATIONS

The present application claims priority to Japanese Patent Application No. 2019-159126 and Japanese Patent Application No. 2020-22821 filed in Japan on Aug. 30, 2019 and Feb. 13, 2020, respectively. The entire contents thereof are incorporated in the present disclosure by reference in the present description.

BACKGROUND ART

Conventionally, there has been known a technique for amorphization of a poorly water-soluble material for the purpose of increasing the water solubility of the poorly water-soluble material or the absorbability thereof in the body.

For example, a method in which a complex of curcumin and/or an analog thereof and a water-soluble cellulose derivative is formed using an organic solvent method having a step of dissolving in a water-organic solvent mixed solution (PTL 1), a method in which (A) a poorly soluble polyphenol, (B) at least one type selected from a plant-derived polysaccharide, a seaweed-derived polysaccharide, a microbial-derived polysaccharide, a plant-derived polypeptide, and a microbial-derived polypeptide, and (C) at least one type selected from a monosaccharide and a disaccharide are mixed, followed by heating and melting, and then cooling and solidifying the molten material (PTL 2), a method in which a crystalline poorly water-soluble polyphenol, a hydrophilic polymer, and a nonionic surfactant are heated and kneaded (PTLs 3 and 4), a method in which crystalline curcumin is melted and amorphized alone, and then a water-soluble polymer such as a dextrin is added thereto (PTL 5), and the like have been proposed.

CITATION LIST

Patent Literature

PTL 1: WO 2015/174475
PTL 2: JP-A-2016-049105
PTL 3: WO 2017/061627
PTL 4: JP-A-2019-123700
PTL 5: WO 2019/160146

SUMMARY OF INVENTION

Technical Problem

However, there has been a demand for the provision of a new solid composition containing an amorphous poorly water-soluble material and a method for producing the same.

An object of the present disclosure is to provide a new solid composition containing an amorphous poorly water-soluble material, a method for producing the same, and the like.

Further another object of the present disclosure is to provide a method for easily determining the proportion of a crystalline material and/or an amorphous material in a poorly water-soluble material contained in the solid composition.

Solution to Problem

The present disclosure includes the following aspects.
[1] Solid Composition Containing Amorphous Poorly Water-Soluble Material
  [1-1] A solid composition containing
    an amorphous poorly water-soluble material (1a),
    hydroxypropylmethyl cellulose (hereinafter abbreviated as "HPMC") (2), and
    a polysaccharide of 5 or more sugars (3) other than HPMC, wherein
    an XRD analysis value of the solid composition is 4.0% or less:
    provided that the XRD analysis value is a numerical value calculated according to the formula: $\{(S2)/((S1)+(S2))\} \times 100(\%)$ when an area of a halo peak in the range of $2\theta=5$ to $60°$ is represented by (S1) and an area of a sharp peak derived from a poorly water-soluble material in a crystalline state (1b) in a portion exceeding the halo peak is represented by (S2) in a chart obtained when the solid composition is analyzed by a powder X-ray diffractometer (the same applies hereinafter).
  [1-2] The solid composition according to the above [1-1], wherein the amorphous poorly water-soluble material (1a) is at least one type selected from the group consisting of a polyphenol, a polyphenol derivative, a carotenoid, coenzyme Q10, a vitamin, and sesamin.
    [1-3] The solid composition according to [1-2], wherein
    the polyphenol is at least one type selected from the group consisting of curcumin, luteolin, silymarin, rutin, quercetin, myricitrin, quercitrin, isoquercitrin, naringenin, resveratrol, and hesperetin,
    the polyphenol derivative is a polymethoxyflavonoid,
    the carotenoid is at least one type selected from the group consisting of a xanthophyll, a carotene, and an apocarotenoid, and
    the vitamin is at least one type selected from the group consisting of vitamin A, vitamin D, vitamin E, and vitamin K.
  [1-4] The solid composition according to at least one of [1-1] to [1-3], wherein
    the polysaccharide (3) is selected from the group consisting of gum arabic, hydroxypropyl cellulose (HPC), ghatti gum, low-molecular weight ghatti gum, processed starch, locust bean gum, guar gum, alginic acid, a salt of alginic acid, a carrageenan, pectin, xanthan gum, Pullulan, microcrystalline cellulose, fermented cellulose, methyl cellulose, carboxymethyl cellulose (CMC), a dextrin (including an indigestible dextrin), a cyclodextrin (including α-cyclodextrin, β-cyclodextrin, and γ-cyclodextrin), a soybean polysaccharide, agar, tamarind seed gum, a guar gum decomposition product, karaya gum, tara gum, welan gum, and gellan gum.
  [1-5] The solid composition according to [1-4], wherein the polysaccharide (3) is a combination of hydroxypropyl cellulose (HPC) and a polysaccharide other than HPC.

[1-6] The solid composition according to [1-5], wherein the polysaccharide other than HPC is gum arabic.

[1-7] The solid composition according to any one of [1-1] to [1-6], wherein the XRD analysis value is 1.0% or less.

[1-8] A solid composition obtained by adding a crystalline poorly water-soluble material (1b) to the solid composition according to any one of [1-1] to [1-7].

[2] Use of Solid Composition

[2-1] An oral composition containing the solid composition according to any one of the above [1-1] to [1-8].

[2-2] A pharmaceutical product, a quasi-drug, a food or drink, an oral care product, or a cosmetic, containing the solid composition according to any one of the above [1-1] to [1-8] together with an additive for the pharmaceutical product, the quasi-drug, the food or drink, the oral care product, or the cosmetic.

[3] Method for Producing Solid Composition Containing Amorphous Poorly Water-Soluble Material

[3-1] A method for producing the solid composition according to any one of the above [1-1] to [1-8], including a step of heating and kneading a crystalline poorly water-soluble material (1b), HPMC (2), and a polysaccharide of 5 or more sugars (3) other than HPMC using a kneader.

[3-2] The production method according to the above [3-1], wherein the crystalline poorly water-soluble material (1b) is at least one type selected from the group consisting of a polyphenol, a polyphenol derivative, a carotenoid, coenzyme Q10, a vitamin, and sesamin.

[3-3] The production method according to the above [3-1] or [3-2], which is a method of carrying out the heating and kneading step under a temperature condition equal to or higher than the glass transition temperature Tg of the crystalline poorly water-soluble material (1b).

[3-4] The production method according to any one of the above [3-1] to [3-3], further including at least one step selected from the group consisting of a cooling step, a crushing or pulverizing step, a drying step, a granulation step, and a sizing step.

[4] Method for Calculating Proportion of Crystalline Material and/or Amorphous Material in Poorly Water-Soluble Material

[4-1] A method for calculating the proportion of a crystalline material (1b) and/or an amorphous material (1a) contained in a poorly water-soluble material (1) in a solid composition (measurement sample) containing the poorly water-soluble material (1), HPMC (2), and a polysaccharide of 5 or more sugars (3) other than HPMC, including the following steps:

(A) a step of determining an XRD analysis value of the measurement sample; and (B) a step of calculating the proportion of the crystalline material (1b) and/or the amorphous material (1a) in the poorly water-soluble material contained in the measurement sample by applying the XRD analysis value of (A) to a calibration curve prepared in advance, wherein the calibration curve is prepared by determining an XRD analysis value of each standard sample with respect to standard samples containing the crystalline poorly water-soluble material (1b) in various proportions, and plotting the proportion (%, theoretical value) of the crystalline material (1b) in the standard sample or in the poorly water-soluble material contained in the standard sample on the X axis and the XRD analysis value on the Y axis.

[4-2] The calculation method according to [4-1], wherein the standard samples are two or more solid compositions containing the poorly water-soluble material (1) containing crystalline and amorphous poorly water-soluble materials in given proportions, HPMC (2), and the polysaccharide of 5 or more sugars (3) other than HPMC.

[4-3] A method for evaluating or controlling the quality of a solid composition, including calculating the proportions of a crystalline material and/an amorphous material in a poorly water-soluble material contained in a solid composition by the method according to [4-1] or [4-2].

Advantageous Effects of Invention

According to the present disclosure, a new solid composition containing an amorphous poorly water-soluble material having a high amorphous property and long-term stability, a method for producing the same, and the like are provided. Further, according to the present disclosure, with respect to a solid composition containing crystalline and amorphous poorly water-soluble materials, the proportion (content ratio) of a crystalline material and/or an amorphous material contained in the poorly water-soluble material can be calculated and used for evaluation or control of the quality of the solid composition.

BRIEF DESCRIPTION OF DRAWINGS

FIG. 1-1 shows materials of solid compositions (Examples 1 to 4 and Example 1') produced in Test Example 1 and the evaluation results of the solid compositions. Specifically, the content residual ratio (%) of a poorly water-soluble material (curcumin), the evaluation results of the amorphous property of the poorly water-soluble material (a powder X-ray diffractometer (XRD) analysis chart, the degree of amorphization [XRD analysis value/evaluation]), and the evaluation results of changes in appearance after storage are shown. In the drawing, the X axis of the XRD analysis chart shows $2\theta$ (°), and the measurement was performed at $2\theta=5°$ to 60°. Since no peak was observed in the range of $2\theta=40°$ to 60°, only the range of $2\theta=50$ to 400 is shown in FIGS. 1-2 to 7-1 below. Further, the Y axis of the XRD analysis chart shows a signal intensity and represents 0 to 5000 counts (the same applies to FIGS. 1-2 to 4-4 and 6). In the drawing, the "XRD analysis value" indicated with * means a value calculated according to $\{(S2)/((S1)+(S2))\}\times 100$ (the same applies to FIGS. 2-1 to 7-1). In the drawing, the storage condition indicated with ** is "1 month at 40° C. and 75% relative humidity" (the same applies to FIGS. 1-2 to 4-4. However, for the poorly water-soluble material tested by changing the storage period, the condition will be described below.)

FIG. 1-2 shows materials of solid compositions (Comparative Examples 1 to 5) produced in Test Example 1 and the evaluation results of the solid compositions.

FIG. 2-1 shows materials of solid compositions (Examples 5 to 8) produced in Test Example 2 and the evaluation results of the solid compositions.

FIG. 2-2 shows materials of solid compositions (Examples 9 to 12) produced in Test Example 2 and the evaluation results of the solid compositions.

FIG. 3-1 shows materials of solid compositions (Examples 13 to 16) produced in Test Example 3 and the evaluation results of the solid compositions.

FIG. 3-2 shows materials of solid compositions (Examples 17 to 20) produced in Test Example 3 and the evaluation results of the solid compositions.

FIG. 3-3 shows materials of solid compositions (Examples 21 to 24) produced in Test Example 3 and the evaluation results of the solid compositions.

FIG. 3-4 shows materials of solid compositions (Examples 25 to 28) produced in Test Example 3 and the evaluation results of the solid compositions.

FIG. 3-5 shows materials of solid compositions (Examples 29 to 32) produced in Test Example 3 and the evaluation results of the solid compositions.

FIG. 3-6 shows materials of solid compositions (Examples 33 to 36) produced in Test Example 3 and the evaluation results of the solid compositions.

FIG. 3-7 shows materials of solid compositions (Examples 37 to 38) produced in Test Example 3 and the evaluation results of the solid compositions.

FIG. 4-1 shows materials of solid compositions (Examples 39 to 42) produced in Test Example 4 and the evaluation results of the solid compositions.

FIG. 4-2 shows materials of solid compositions (Examples 43 to 45) produced in Test Example 4 and the evaluation results of the solid compositions. **: after two-week storage only in Example 43

FIG. 4-3 shows materials of solid compositions (Examples 46 to 48) produced in Test Example 4 and the evaluation results of the solid compositions. **: after two-week storage only in Example 46

FIG. 4-4 shows materials of solid compositions (Examples 49 to 50, and Comparative Example 6) produced in Test Example 4 and the evaluation results of the solid compositions. **: after two-week storage in Example 50 and Comparative Example 6

FIG. 5 shows materials of solid compositions (Comparative Examples 7 and 8) produced using an organic solvent method in Test Example 5 and the evaluation results of the obtained solid compositions.

FIG. 6 shows materials of solid compositions (Comparative Examples 9 to 12) produced in Test Example 6 and the evaluation results of the obtained solid compositions.

FIG. 7-1 shows materials of powder mixtures (test samples 1 to 5) produced in Test Example 7 and the XRD analysis results (XDR analysis charts and XRD analysis values) of the obtained powder mixtures.

FIG. 7-2 shows a calibration curve obtained by plotting the proportion of crystalline curcumin in each of the powder mixtures (test samples 1 to 5) shown in FIG. 7-1 (the content ratio % of the crystalline CUR in the powder mixture) on the X axis and the XRD analysis value obtained for each of the powder mixtures on the Y axis.

FIG. 7-3 shows a calibration curve obtained by plotting the proportion of crystalline curcumin in total curcumin (CUR) contained in each of the powder mixtures (test samples 1 to 5) shown in FIG. 7-1 (the content ratio % of the crystalline CUR in the total CUR content) on the X axis and the XRD analysis value obtained for each of the powder mixtures on the Y axis.

DESCRIPTION OF EMBODIMENTS

Terms

Unless otherwise specified, the symbols and abbreviations in the present description can be understood in the meanings usually used in the technical field to which the present invention belongs in accordance with the context of the present description. In the present description, the term "contains" is used with the intention of including the meaning of the term "consists essentially of" and the meaning of the term "composed of". Unless otherwise specified, a step, a treatment, or an operation described in the present description can be performed at room temperature. In the present description, the room temperature can mean a temperature within the range of 10 to 40° C.

<Solid Composition Containing Amorphous Poorly Water-Soluble Material (1a)>

The solid composition which is one aspect of the present disclosure (hereinafter, also referred to as "the present solid composition") contains
 an amorphous poorly water-soluble material (1a),
 hydroxypropyl methylcellulose (HPMC) (2), and
 a polysaccharide (3) other than HPMC.

1. Poorly Water-Soluble Material (1)

Hereinafter, in the present description, an amorphous poorly water-soluble material is referred to as "amorphous material (1a)" or "poorly water-soluble material (1a)", and a crystalline poorly water-soluble material is referred to as "crystalline material (1b)" or "poorly water-soluble material (1b)", and in the case where both materials are collectively referred to without distinction, they are described as "poorly water-soluble material (1)".

The poorly water-soluble material (1) covered by the present disclosure is a poorly water-soluble substance that does not dissolve in water or even if it dissolves in water, only a small amount dissolves. The poorly water-soluble material before undergoing an amorphization step contains a large amount of a poorly water-soluble material (1b) in a crystalline state.

The poorly water-soluble material (1b) in a crystalline state can have at least one of the following properties.

(i) The solubility in pure water at 25° C. is 0.1 mass % or less.

Here, the evaluation and determination of the solubility can be carried out as follows in accordance with the rule of the Japanese Pharmacopoeia.

Evaluation is performed based on the degree of dissolution within 30 minutes when a material is added to pure water at 25° C. in a proportion to give a concentration of 0.1 mass % and shaken vigorously for 30 seconds every 5 minutes. In the case where an insoluble matter is observed when the aqueous solution is visually observed after 30 minutes have elapsed, it can be determined that the solubility in pure water at 25° C. is 0.1 mass % or less.

(ii) The octanol/water partition coefficient (log P) is within the range greater than 1 and 21 or less.

The range is preferably greater than 1 and 9 or less. The log P value can be determined in silico using a calculation software such as ALOGPS (URL: http://www.vcclab.org/lab/alogps/) for a compound whose molecular structure has been elucidated.

On the other hand, for a compound whose molecular structure is unknown, the log P value can be experimentally determined using the following formula by high-performance liquid chromatography in accordance with JIS Z 7260-117 (2006).

log P=log(Coc/Cwa)

Coc: Concentration of test substance in 1-octanol layer

Cwa: Concentration of test substance in aqueous layer (iii) The solubility in the 2nd fluid according to the Japanese Pharmacopoeia 16th Edition measured by a method in accordance with the Japanese Pharmacopoeia Dissolution Test method (paddle method) is 3 mg/100 mL or less.

The poorly water-soluble material (1) can be, for example, a poorly water-soluble bioactive substance. In the present description, the bioactive substance means a compound that acts on a living body, preferably a human body, to cause some sort of biological reaction or to control a biological response.

Preferred examples of the poorly water-soluble material (1) include one or more types selected from the group consisting of a polyphenol, a polyphenol derivative, a carotenoid, coenzyme Q10, a vitamin, and sesamin. More preferred examples of the poorly water-soluble material (1) include one or more types selected from the group consisting of a polyphenol, a polymethoxyflavonoid (PMF) as a polyphenol derivative, and a carotenoid. Still more preferred examples of the poorly water-soluble material (1) include one or more types selected from polyphenols.

The poorly water-soluble material (1) can be a compound that contains one or more (preferably 2 or more) conjugated dienes and that may contain one or more oxygen atoms as needed. The conjugated diene structure may be a part of a ring (for example, benzene or cyclohexadiene).

Examples of such a poorly water-soluble material (1) preferably include curcuminoids; flavonoids having a flavone skeleton, an isoflavone skeleton, a flavonol skeleton, or a flavanone skeleton; stilbenoids; phenols such as hydroxycinnamic acid and rosmarinic acid (hereinabove, polyphenols); carotenoids; ubiquinone (coenzyme Q10); and vitamin A, D, E, and K (hereinabove, vitamins). Specific examples of the poorly water-soluble material included in these groups will be described below.

1-1. Polyphenol and Polyphenol Derivative

The polyphenol can be one type or a combination of two or more types.

The polyphenol is a plant component having two or more multiple phenolic hydroxy groups (hydroxy groups bonded to an aromatic ring such as a benzene ring or a naphthalene ring) in the molecule, and examples thereof include the following ones. The following examples can be compounds or compositions.

1. Curcuminoids [examples: curcumin (including a keto form and an enol form), dimethoxycurcumin, and bisdemethoxycurcumin], and tetrahydrocurcumin,
2. Flavonoids [flavones (examples: luteolin, apigenin, and diosmin), flabanones (examples: hesperetin, naringenin, hesperidin, and eriodictyol), flavonols (examples: quercetin, myricetin, silibinin, silymarin [a mixture of flavonolignans such as silibinin, isosilibinin, silicristin, and silidianin], simillarin, rutin, isoquercitrin, quercitrin, myricetin, myricitrin, enzyme-treated isoquercitrin, and kenferol), flavanols (examples: catechin (E), gallocatechin, epicatechin (EC), epicatechin gallate (ECg), epigallocatechin (EGC), epigallocatechin gallate (EGCg), theaflavin, theaflavin 3-gallate, theaflavin 3'-gallate, and theaflavin 3,3'-gallate), isoflavones (examples: genistein, daidzein, and glycitein), and anthocyanidins (examples: cyanidin, delphinidin, malvidin, pelargonidin, peonidin, aurantinidin, eurobinidin, luteolinidin, petunidin, and rosinidin), procyanidin, and polycyanidin],
3. Stilbenoids [examples: resveratrol and piceatannol],
4. Tannins [examples: condensed tannins (proanthocyanidins, oligomeric proanthocyanidins (OPCs)), and hydrolyzable tannins],
5. Monophenols [examples: hydroxytyrosol and p-tyrosol],
6. Capsaicinoids [examples: capsaicin and dihydrocapsaicin],
7. Phenolic acid [examples: hydroxycinnamic acid (examples: p-coumaric acid, caffeic acid, and ferulic acid), hydroxybenzoic acid (examples: p-hydroxybenzoic acid, gallic acid, and ellagic acid), and rosmarinic acid],
8. Aglycones of the above-mentioned compounds,
9. Compounds in which a hydrogen atom of at least one phenolic hydroxy group of the above-mentioned compounds is substituted with another group (examples: acetylated products, malonylated products, methylated products, glycosides, etc.)

The polyphenol may be, for example, a synthesized one or one isolated and purified from nature. Further, it may be a crude refined product, for example, may be in the form of an extract derived from a natural product.

Examples of the extract derived from a natural product include a turmeric extract, a bayberry extract, a Japanese pagoda tree extract, a milk thistle extract, a coffee extract, licorice extract, a cucumber extract, a *Millettia reticulata* extract, a *Gentiana* (or gentian) extract, a *Geranium thunbergii* extract, cholesterol and a derivative thereof, a *Crataegus cuneata* extract, a *Paeonia lactiflora* extract, a *Ginkgo biloba* extract, a *Scutellaria baicalensis* (or *Scutellaria* root) extract, a carrot extract, Maikaika (or Japanese Rose Flower or *Rosa rugosa*) extract, a Sanpenzu (or *Chamaecrista nomame*) extract, a *Potentilla tormentilla* extract, a parsley extract, a peony (or moutan bark) extract, a *Chaenomeles speciosa* fruit (or Japanese quince) extract, a *Melissa* extract, a *Centaurea cyanus* (or *Alnus firma*) extract, a Strawberry *Geranium* extract, a rosemary (or *Salvia rosmarinus*) extract, a lettuce extract, a tea extract (for example, an oolong tea extract, a black tea extract, or a green tea extract), a Siraitia grosvenorii extract, and an extract of a microbial fermentation metabolite.

The polyphenol derivative means a compound having zero or one phenolic hydroxy group due to substitution of a hydrogen atom of at least one phenolic hydroxy group of the above-mentioned polyphenol with another group (for example, an acyl group, a malonyl group, an alkyl group, a glycosyl group, or the like). Examples of the polyphenol derivative include, but are not limited to, a polymethoxyflavonoid (hereinafter referred to as PMF). The PMF refers to a flavonoid having 4 or more methoxy groups ($—OCH_3$). Preferred examples include a flavone having 4 or more methoxy groups. The PMF can be one type or a combination of two or more types.

Examples of the PMF include the following ones.

PMF having 4—$OCH_3$ groups: 5,6,7,4'-tetramethoxyflavone

PMF having 5—$OCH_3$ groups: tangeretin, sinensetin

PMF having 6—$OCH_3$ groups: nobiletin, 3,5,6,7,3',4'-hexamethoxyflavone

PMF having 7—$OCH_3$ groups: 3,5,6,7,8,3',4'-heptamethoxyflavone

The PMF may be, for example, a synthesized one or one isolated and purified from nature. Further, it may be a crude refined product, for example, may be in the form of an extract derived from a natural product.

Preferred examples of the polyphenol include a curcuminoid, a flavonoid, a stilbenoid, and aglycones thereof. Among them, preferred examples of the curcuminoid include curcumin. Further, preferred examples of the flavonoid include flavones (example: luteolin), flavanones (examples: hesperetin and naringenin), and flavonols (examples: silibinin, silymarin, rutin, quercetin, myricitrin, quercitrin, and isoquercitrin). Further preferred examples of the stilbenoid include resveratrol.

Further, preferred examples of the polyphenol derivative include nobiletin and tangeretin, each of which is a methylated product of a flavone.

1-2. Carotenoid

The carotenoid can be one type or a combination of two or more types.

Examples of the carotenoid include the following ones. The following examples can be compounds or compositions.

Xanthophylls [examples: lutein, zeaxanthin, canthaxanthin, fucoxanthin, astaxanthin, antheraxanthin, violaxanthin, and cryptoxanthin], carotenes [examples: α-carotene, β-carotene, γ-carotene, δ-carotene, and lycopene], and apocarotenoids [examples: apocarotenol, bixin, and crocetin].

Preferred examples thereof include xanthophylls and carotenes. Among them, preferred examples of the xanthophylls include lutein and astaxanthin. In addition, preferred examples of the carotenes include β-carotene and lycopene.

The carotenoid may be, for example, a synthesized one or one isolated and purified from nature. Further, it may be a crude refined product, for example, may be in the form of an extract derived from a natural product.

1-3. Coenzyme Q10

The coenzyme Q10 can be one type or a combination of two or more types.

Examples of the coenzyme Q10 include ubiquinone (oxidized CoQ), ubiquinol (reduced CoQ: $CoQH_2$), and a semiquinone radical intermediate (CoQH.). In the present disclosure, preferred examples of the coenzyme Q10 include ubiquinol. The ubiquinol is a fat-soluble component also known as reduced coenzyme Q10, reduced coenzyme Q, reduced CoQ, or reduced UQ, and is known as an effective fat-soluble antioxidant.

The coenzyme Q10 may be, for example, a synthesized one or one isolated and purified from nature. Further, it may be a crude refined product, for example, may be in the form of an extract derived from a natural product.

1-4. Vitamin

The vitamin can be one type or a combination of two or more types.

Examples of the vitamin include the following ones. The following examples can be compounds or compositions. Vitamin A [example: retinol], vitamin D [examples: ergosterol, ergocalciferol, and cholecalciferol], vitamin E [examples: tocopherol and tocotrienol], and vitamin K [example: phylloquinone].

The vitamin may be, for example, a synthesized one or one isolated and purified from nature. Further, it may be a crude refined product, for example, may be in the form of an extract derived from a natural product.

1-5. Sesamin

The sesamin is a type of lignan contained in, for example, sesame, Zanthoxylum fruit, *Ginkgo biloba*, or the like.

The sesamin may be, for example, a synthesized one or one isolated and purified from nature. Further, it may be a crude refined product, for example, may be in the form of an extract derived from a natural product.

The present solid composition which is one aspect of the present disclosure is a composition containing at least one selected from the group consisting of the above-mentioned poorly water-soluble materials (1) in an amorphous state, that is, as the amorphous poorly water-soluble material (1a) together with the HPMC (2) and the polysaccharide (3) other than HPMC.

The content of the poorly water-soluble material (1a) in the present solid composition is not limited, but can be generally selected from the range of 1 mass % or more. It can be preferably 5 mass % or more, more preferably 10 mass % or more, and further more preferably 15 mass % or more. Further, the upper limit of the content of the poorly water-soluble material (1a) is not limited, but can be generally selected from 60 mass % or less. It can be preferably 50 mass % or less, more preferably 40 mass % or less, and further more preferably 35 mass % or less. For example, it can be generally within the range of 1 to 60 mass %, preferably within the range of 5 to 50 mass %, more preferably within the range of 10 to 40 mass %, and further more preferably within the range of 15 to 35 mass %.

2. Material for Amorphizing Crystalline Poorly Water-Soluble Material (1b)

In the present invention, it is characterized in that two or more types of polysaccharides are used in combination in order to obtain the amorphous poorly water-soluble material (1a) by amorphizing the crystalline poorly water-soluble material (1b). By using two or more types of polysaccharides in combination, the crystalline poorly water-soluble material (1b) can be amorphized in high yield. Further, preferably, the amorphous state of the obtained poorly water-soluble material (1a) can also be stabilized. More preferably, a solid composition containing the amorphous poorly water-soluble material (1a), in which changes in appearance (for example, caking, solidification, color change, etc.) that occur under the influence of high temperature and high humidity or under storage are suppressed, and the storage stability is excellent, can be provided.

In one aspect of the present disclosure, as a material for amorphizing the poorly water-soluble material (1b) and preparing the amorphous poorly water-soluble material (1a), a combination of hydroxypropylmethyl cellulose (HPMC) (2) and one or more types of polysaccharides (3) other than HPMC can be exemplified.

The material used for amorphizing the poorly water-soluble material (1b) will be specifically described below.

2-1. Hydroxypropylmethyl Cellulose (HPMC) (2)

Hereinafter, in the present description, the second component contained in the solid composition or the like of the present invention is sometimes referred to as "HPMC".

The HPMC is a cellulose ether in which a hydroxypropoxyl group is introduced into methyl cellulose, and is a water-soluble cellulose derivative.

The HPMC used in the present disclosure includes, but is not particularly limited to, HPMC in which the degrees of substitution with a methoxy group and a hydroxypropoxy group (the contents of a methoxy group and a hydroxypropoxy group) are in the following ranges, respectively:

the degree of substitution with a methoxy group: in the range of 20 to 40%, preferably 25 to 35%, more preferably 27 to 30%, the degree of substitution with a hydroxypropoxy group: in the range of 3 to 20%, preferably 5 to 15%, more preferably 7 to 12%.

It is preferably HPMC in which the degree of substitution with a methoxy group is in the range of 25 to 35% and the degree of substitution with a hydroxypropoxy group is in the range of 5 to 15%, and more preferably HPMC in which the degree of substitution with a methoxy group is in the range of 27 to 30% and the degree of substitution with a hydroxypropoxy group is in the range of 7 to 12%. It is also possible to use two or more types of HPMC in combination if desired.

Further, the HPMC used in the present disclosure includes, but is not particularly limited to, HPMC having a viscosity in the range of 2 to 120 $mm^2/s$ when it is prepared in an aqueous solution (20° C.) having a concentration of 2 mass %. It is preferably in the range of 3 to 100 $mm^2/s$, and more preferably in the range of 4 to 80 $mm^2/s$.

Such HPMC is commercially available as one for a food additive or for a pharmaceutical preparation. As such HPMC, METOLOSE (registered trademark, the same applies hereinafter) SE-03, METOLOSE SE-06, METOLOSE NE-100, METOLOSE SFE-400, METOLOSE NE-4000, and METOLOSE SFE-4000 (hereinabove manufactured by Shin-Etsu Chemical Co., Ltd.) can be exemplified.

The content of the HPMC in the present solid composition is not limited, but can be generally selected from the range of 20 mass % or more. It can be preferably 30 mass % or more, more preferably 35 mass % or more, and further more preferably 40 mass % or more. Further, the upper limit of the content of the HPMC is not limited, but can be generally selected from 95 mass % or less. It can be preferably 90 mass % or less, more preferably 85 mass % or less, and further more preferably 80 mass % or less. For example, it can be generally within the range of 20 to 95 mass %, preferably within the range of 30 to 90 mass %, more preferably within the range of 35 to 85 mass %, and further more preferably within the range of 40 to 80 mass %.

2-2. Polysaccharide of 5 or More Sugars (3) Other than HPMC

In the present invention, the polysaccharide used in combination with HPMC is a polysaccharide other than HPMC and is characterized by containing 5 or more constituent sugars. Hereinafter, in the present description, the polysaccharide is sometimes referred to as "polysaccharide of 5 or more sugars (3)" or simply "polysaccharide (3)". In the polysaccharide (3), HPMC is not included. The number of monosaccharides constituting the polysaccharide is not limited as long as the polysaccharide (3) is a polysaccharide of 5 or more sugars. It is preferably larger than 5 sugars (example: the molecular weight is about 800), and for example, 6 or more sugars (example: the molecular weight of α-CD is 972), 7 or more sugars (example: the molecular weight of β-CD is 1135), 8 or more sugars (example: the molecular weight of γ-CD is 1297), 9 or more sugars, and 10 or more sugars can be exemplified. Note that the monosaccharide constituting the polysaccharide is not particularly limited, and includes pentoses (including aldopentoses, ketopentoses, and deoxy sugars thereof) and hexoses (aldohexoses, ketohexoses, and deoxy sugars thereof). In the examples of the polysaccharide (3), linear, branched, and cyclic polysaccharides are all included. For example, a cyclodextrin, which will be described later, is a cyclic water-soluble polysaccharide having a structure in which 6 to 8 monosaccharides are cyclically linked.

Examples of the polysaccharide (3) used in combination with HPMC include, but are not limited to, gum arabic, hydroxypropyl cellulose (HPC), ghatti gum, low-molecular weight ghatti gum, processed starch, locust bean gum, guar gum, alginic acid or a salt thereof, a carrageenan (including L-carrageenan, λ-carrageenan, and κ-carrageenan), pectin (including HM pectin and LH pectin), xanthan gum, Pullulan, microcrystalline cellulose, fermented cellulose, methyl cellulose, carboxymethyl cellulose (CMC), a dextrin (including an indigestible dextrin), a cyclodextrin (including α-cyclodextrin, β-cyclodextrin, and γ-cyclodextrin), a soybean polysaccharide, agar, tamarind seed gum, a guar gum decomposition product, karaya gum, tara gum, welan gum, and gellan gum (including native gellan gum and acetylated gellan gum). Here, the ghatti gum includes one having a molecular weight of 800,000 or more, and the low-molecular weight ghatti gum includes one having a molecular weight less than 800,000, and preferably one having a molecular weight of about 100,000 to 200,000 in terms of emulsifying power. Preferred examples of the polysaccharide (3) include, but are not limited to, gum arabic, HPC, low-molecular weight ghatti gum, processed starch, pectin, a soybean polysaccharide, Pullulan, microcrystalline cellulose, fermented cellulose, tamarind seed gum, a guar gum decomposition product, a dextrin (including an indigestible dextrin), CMC, a cyclodextrin, and a carrageenan. More preferred polysaccharides (3) are gum arabic and HPC.

Among the polysaccharides (3), one type alone can be used in combination with the HPMC (2), or two or more types can be arbitrarily combined and used in combination with the HPMC (2). The combination is not particularly limited, but for example, HPC is a water-soluble polysaccharide that is easily combined with any other polysaccharide (3). Examples of the mode of combination are not limited, but preferably, a combination of HPC and gum arabic can be exemplified.

The HPC is a water-soluble cellulose derivative obtained by etherifying a hydroxy group of cellulose with propylene oxide and having a large number of hydroxypropyl groups ($-OCH_2CH(OH)CH_3$). The degree of substitution (DS), which is the average number of substituted hydroxy groups per glucose, is at most 3. Further, the degree of molar substitution (MS), which is the number of hydroxypropyl groups per glucose, is 4 or more. As for the molecular weight of HPC, a mass average molecular weight in the range of 40,000 to 910,000 of a commercially available one as a food additive can be exemplified, but the range of the molecular weight can be appropriately selected and set as needed. For example, although not limited, Celny (registered trademark, the same applies hereinafter) SSL (molecular weight 40,000), Celny SL (molecular weight 100,000), Celny L (molecular weight 140,000), Celny M (molecular weight 620,000), and Celny H (molecular weight 910,000) (hereinabove manufactured by Nippon Soda Co., Ltd.) can be exemplified. In the present disclosure, it is satisfactory as long as it is water soluble, and although it is not limited, preferably, one having a mass average molecular weight of 40,000 to 140,000 can be exemplified. The molecular weight of HPC can be measured by gel permeation chromatography (GPC method).

The role of the polysaccharide (3) used in combination with HPMC in the amorphization of the poorly water-soluble material (1b) can be considered as follows. However, this is just a hypothesis and it is not bound by this.

When the polysaccharide (3) is added to the poorly water-soluble material (1b) together with the HPMC (2) and all the components are heated and kneaded (preferably heated and kneaded under a temperature condition equal to or higher than the glass transition point of the poorly water-soluble material (1b)), followed by cooling, the poorly water-soluble material (1a) amorphized by heating and kneading is trapped by the polysaccharides (the HPMC (2) and the polysaccharide (3)) until it is cooled, and as a result, recrystallization due to aggregation of the poorly water-soluble materials is prevented.

Therefore, the molecular weight of the polysaccharide (3) is preferably larger than the molecular weight of the poorly water-soluble material (1b) to be amorphized. That is, the polysaccharide (3) used for amorphizing the poorly water-soluble material (1b) can be selected from polysaccharides having a molecular weight larger than the molecular weight of the poorly water-soluble material (1b), which is used as an index.

For example, as the molecular weight of the polysaccharide (3), a molecular weight of 800 or more, $1 \times 10^4$ or more, $5 \times 10^4$ or more, or $1 \times 10^5$ or more can be exemplified, but it is not limited thereto.

In the present invention, in order to amorphize the poorly water-soluble material (1b), the combined use of a material other than the polysaccharide (3) with HPMC is not excluded. However, for example, the combined use of a disaccharide such as palatinose (registered trademark, the same applies hereinafter) or maltose, a trisaccharide such as raffinose, or a surfactant such as polysorbate 80 with HPMC is sometimes not preferred for stably maintaining the amorphous state of the poorly water-soluble material (1a).

Therefore, in one aspect of the present disclosure, it is preferred not to use a disaccharide such as palatinose or maltose, a trisaccharide such as raffinose, or a surfactant such as polysorbate 80 as the material used in combination with HPMC for amorphizing the poorly water-soluble material (1b).

The content (total amount) of the polysaccharide (3) in the present solid composition can be generally selected from the range of 1 mass % or more. It can be preferably 4 mass % or more, more preferably 5 mass % or more, and further more preferably 10 masse or more or 12 mass % or more. Further, the upper limit of the content of the polysaccharide (3) is not limited, but can be generally selected from 80 mass % or less. It can be preferably 75 mass % or less, more preferably 70 mass % or less, and further more preferably 60 mass % or less or 50 mass % or less. For example, it can be generally within the range of 1 to 80 mass %, preferably within the range of 4 to 75 mass %, more preferably within the range of 5 to 70 mass %, and further more preferably within the range of 10 to 60 mass %.

Note that the content of HPC in the present solid composition when HPC is used alone or in combination with another polysaccharide (3) as the polysaccharide (3) is not limited, but can be generally selected from the range of 1 mass % or more. It can be preferably 2 mass % or more, more preferably 5 mass % or more, and further more preferably 8 mass % or more. Further, the upper limit of the content of HPC in the present solid composition can be generally selected and set from the range of 50 mass % or less. It can be preferably 40 mass % or less, more preferably 30 mass % or less, and further more preferably 20 mass % or less. The content of HPC in the present solid composition can be generally within the range of 1 to 50 mass %, preferably within the range of 3 to 40 mass %, more preferably within the range of 5 to 30 mass %, and further more preferably within the range of 8 to 20 mass %.

The mass ratio of the amorphous poorly water-soluble material (1a) and the HPMC (2) in the present solid composition which is one aspect of the present disclosure can be set so that the ratio of the HPMC (2) with respect to 1 part by mass of the poorly water-soluble material (1a) is generally within the range of 0.3 to 95 parts by mass. It is preferably within the range of 0.5 to 20 parts by mass. By using the poorly water-soluble material (1b) and the HPMC (2) in combination with the polysaccharide (3) so that at least the mass ratio is in this range, the poorly water-soluble material (1b) can be stably amorphized in good yield, and the present solid composition containing the poorly water-soluble material (1a) can be stably obtained. It is more preferably within the range of 1 to 20 parts by mass, and further more preferably 3 to 20 parts by mass. By using the poorly water-soluble material (1b) and the HPMC (2) in combination with the polysaccharide (3) so that at least the mass ratio is in this range, the poorly water-soluble material (1b) can be stably amorphized in good yield, and also the obtained present solid composition has favorable storage stability, and can significantly suppress changes in appearance (caking, color change, etc.) due to storage. Note that as another aspect, the ratio of the HPMC (2) with respect to 1 part by mass of the poorly water-soluble material (1a) contained in the present solid composition can be within the range of 0.6 to 18 parts by mass, more preferably within the range of 1 to 8.5 parts by mass, and further more preferably within the range of 1.5 to 5 parts by mass.

The mass ratio of the polysaccharide (3) used in combination with the amorphous poorly water-soluble material (1a) and the HPMC (2) in the present solid composition which is one aspect of the present disclosure can be set so that the ratio of the polysaccharide (3) with respect to 1 part by mass of the poorly water-soluble material (1a) is generally within the range of 0.02 to 50 parts by mass. It is preferably within the range of 0.05 to 20 parts by mass. By using the poorly water-soluble material (1b) and the polysaccharide (3) in combination with the HPMC (2) so that at least the mass ratio is in this range, the poorly water-soluble material (1b) can be stably amorphized in good yield, and the present solid composition containing the poorly water-soluble material (1a) can be stably obtained. It is more preferably within the range of 1 to 10 parts by mass, and more preferably 1 to 5 parts by mass. By using the poorly water-soluble material (1b) and the polysaccharide (3) in combination with the HPMC (2) so that at least the mass ratio is in this range, the poorly water-soluble material (1b) can be stably amorphized in good yield, and also the obtained present solid composition has favorable storage stability, and can significantly suppress changes in appearance (caking, color change, etc.) due to storage. Note that as another aspect, the ratio of the polysaccharide (3) with respect to 1 part by mass of the poorly water-soluble material (1a) contained in the present solid composition can be preferably within the range of 0.06 to 8 parts by mass, more preferably within the range of 0.1 to 3 parts by mass, and further more preferably within the range of 0.2 to 2 parts by mass.

The mass ratio of the HPMC (2) and the polysaccharide (3) in the present solid composition which is one aspect of the present disclosure can be set so that the ratio of the polysaccharide (3) with respect to 1 part by mass of the HPMC (2) is generally within the range of 0.01 to 5 parts by mass. It is preferably within the range of 0.05 to 5 parts by mass. By using the HPMC (2) and the polysaccharide (3) in combination with the poorly water-soluble material (1b) so that at least the mass ratio is in this range, the poorly water-soluble material (1b) can be stably amorphized in good yield, and the present solid composition containing the poorly water-soluble material (1a) can be stably obtained. It is more preferably within the range of 0.05 to 1 part by mass, and more preferably 0.05 to 0.5 parts by mass. By using the HPMC (2) and the polysaccharide (3) in combination with the poorly water-soluble material (1b) so that at least the mass ratio is in this range, the poorly water-soluble material (1b) can be stably amorphized in good yield, and also the obtained present solid composition has favorable storage stability, and can significantly suppress changes in appearance (caking, color change, etc.) due to storage. Note that as another aspect, the ratio of the polysaccharide (3) with respect to 1 part by mass of the HPMC (2) can be within the range of 0.01 to 2.5 parts by mass, preferably within the range of 0.03 to 1.3 parts by mass, more preferably within the range of 0.06 to 0.9 parts by mass, and further more preferably within the range of 0.1 to 0.5 parts by mass.

The present solid composition is characterized by having a solid form. The solid form includes a powder form, a granule form, a lump form, and a rod form. As will be described later, for example, the present solid composition is used for producing a product having a desired form (for example, a preparation form) by being mixed with another optional additive that does not affect the crystalline state (the proportions of a crystalline material and an amorphous material) of the poorly water-soluble material (1). In this case, the present solid composition is preferably prepared in the form of a powder or a granule.

The particle diameter of the powder or the granule in this case can be appropriately selected according to the form.

For example, the particle diameter (median diameter, the same applies hereinafter) can be within the range of 0.1 to 2000 µm, 1.0 to 1000 µm, 10 to 500 µm, 100 to 500 µm, 100 to 400 µm, 1 to 100 µm, 5 to 100 µm, or 10 to 100 µm.

In the solid composition of the present invention, it is considered that as the particle diameter is smaller, the surface area becomes larger and the speed at which a supersaturated state is reached is improved. On the other hand, if the composition contains a coarse powder in a large amount, an inconvenience such that a hard capsule cannot be filled with the composition or the composition cannot be tableted occurs, and therefore, the particle diameter may be adjusted by a means such as pulverization with a pulverizer. Further, the particle diameter (median diameter) can be measured according to the description of Examples described later.

The amorphous state of the poorly water-soluble material (1) contained in the solid composition of the present invention can be confirmed by powder X-ray diffractometry. The powder X-ray diffractometry is a method conventionally used for detecting a crystalline material contained in a sample. In a chart obtained by the method, a scattered light due to an amorphous material is detected as a broad peak (in the present invention, this is referred to as "halo peak"), and a diffraction line due to a crystalline material is detected as a sharp peak (in the present invention, this is referred to as "sharp peak").

The amorphous state of the poorly water-soluble material (1) contained in the solid composition of the present invention can be simply evaluated based on a numerical value (in the present invention, this is also referred to as "XRD analysis value") obtained according to the formula: $\{(S2)/((S1)+(S2))\} \times 100(\%)$ in which an area of a halo peak in the range of $2\theta=5$ to $60°$ is represented by (S1) and an area of a sharp peak derived from the poorly water-soluble material in a crystalline state (1b) (a portion exceeding the halo peak) in the same range is represented by (S2) in a chart (XRD analysis chart) obtained by analyzing the present solid composition with a powder X-ray diffractometer.

It is suggested that the smaller the numerical value (XRD analysis value) is, the more the poorly water-soluble material in an amorphous state (1a) in the poorly water-soluble material contained in the present solid composition is contained. However, quantitative determination cannot be accurately carried out, and it does not indicate a specific proportion of the poorly water-soluble material in an amorphous state (1a) contained in the sample.

In the present solid composition, the XRD analysis value is, for example, 4.0% or less, 3.0% or less, 2.0% or less, 1.0% or less, 0.8% or less, 0.5% or less, or 0%. The present solid composition preferably has an XRD analysis value of 1.0% or less. A more preferred present solid composition has an XRD analysis value of 0%, and the solid composition does not substantially or completely contain the crystalline poorly water-soluble material (1b).

In the present solid composition, the crystalline property of the poorly water-soluble material (1) contained therein has decreased or disappeared, and therefore, it is considered that the disintegratability, dispersibility, elution property, and/or non-aggregability when it comes in contact with an aqueous solvent (example: water or a body fluid) is excellent.

Therefore, when the present solid composition is administered into the body, an effect of increasing the maximum blood concentration (Cmax) of the poorly water-soluble material (1a) contained in the composition, and an effect of increasing the total absorption amount of the material in the blood can be expected.

Due to this property, according to the present solid composition, the function (for example, bioactivity) of the poorly water-soluble material (1) can be highly exhibited.

In addition, in the present solid composition, caking and color change due to storage are suppressed, and storage stability is excellent.

The present solid composition can be produced, for example, by a production method described below (sometimes referred to as "the production method of the present invention" in the present description).

<Method for Producing Solid Composition Containing Amorphous Poorly Water-Soluble Material (1a)>

The present solid composition can be produced, for example, by a production method including a step of heating and kneading a crystalline poorly water-soluble material (1b), HPMC (2), and a polysaccharide of 5 or more sugars (3) other than HPMC.

By the heating and kneading step, the crystalline poorly water-soluble material (1b) can be converted into an amorphous material.

The heating and kneading step is not particularly limited as long as the crystalline poorly water-soluble material (1b) can be melted, and can be carried out in accordance with a conventional method in the art. For example, as a method for amorphizing the crystalline poorly water-soluble material (1b), a method of heating the crystalline poorly water-soluble material (1b) until it melts is exemplified. On the other hand, an organic solvent method in which the crystalline poorly water-soluble material (1b) or the like is dissolved in an organic solvent (heating or stirring may sometimes be performed to increase the solubility) is not included in the production method of the present invention because an amorphous preparation with high purity cannot be prepared with the formulation of the present solid composition.

In the production method of the present invention, an organic solvent is not used, and therefore, it is necessary to heat the crystalline poorly water-soluble material (1b) to a temperature at which it melts, and further, when a material having high viscoelasticity (for example, xanthan gum or the like) is used among the HPMC (2) and the polysaccharide (3) used in combination for maintaining the amorphous state, a certain amount of torque is needed in the kneading step. In this regard, the heating and kneading step that can be used in the production method of the present invention can be favorably carried out by using, for example, a kneading machine such as a kneader or a mixer; or an extruding machine (extruder) such as a uniaxial extruder, an intermeshing screw extruder, or a multi-screw extruder (for example, a twin-screw extruder), each of which is temperature controllable. According to the kneading machine, by performing a plurality of operations (kneading operation) such as mixing, crushing, kneading, and pounding, a state where the materials are uniformly mixed is formed, and also the crystalline poorly water-soluble material (1b) can be converted into an amorphous material. The extruder is a machine that can simultaneously or continuously carry out the kneading operation and extrusion. According to the extruder, similarly to the kneading machine, the materials are uniformly mixed and also the crystalline poorly water-soluble material (1b) is converted into an amorphous material, and then, the present solid composition containing the obtained amorphous poorly water-soluble material (1a) can be discharged by extrusion.

In the heating and kneading step that can be used in the production method of the present invention, for example, kneading of the poorly water-soluble material (1b), the HPMC (2), and the polysaccharide (3) is preferably performed under a temperature condition equal to or higher than the glass transition temperature Tg (° C.) of the poorly water-soluble material (1b). When two or more types of poorly water-soluble materials (1b) are used in combination, the step can be carried out by heating and kneading under a temperature condition equal to or higher than the glass transition temperature Tg (° C.) of the poorly water-soluble material (1b) with the highest glass transition temperature. The glass transition temperature (Tg) can be determined in accordance with JIS K 7121:2012. For example, when the poorly water-soluble material (1b) is a curcuminoid, its glass transition temperature Tg is 72° C., and therefore, as the heating and kneading temperature, a temperature of 80° C. or higher, preferably higher than 80° C. can be adopted. Therefore, for example, the kneading temperature when a curcuminoid is amorphized can be 100° C. or higher, 110° C. or higher, 120° C. or higher, 130° C. or higher, 140° C. or higher, 150° C. or higher, or 160° C. or higher.

The upper limit of the temperature adopted for the heating and kneading is not particularly limited, but can be, for example, Tm (the melting point of the poorly water-soluble material (1b))+40 (° C.) to Tm-10 (° C.). When two or more types of poorly water-soluble materials (1b) are used in combination, the melting point Tm (° C.) means the melting point Tm (° C.) of the material with the highest melting point. The melting point (Tm) can be determined in accordance with JIS K 7121-1987.

Further, the upper limit temperature is desirably a temperature at which the polysaccharide (3) is not excessively decomposed, and for example, 240° C. or lower, preferably 230° C. or lower, and more preferably 220° C. or lower are exemplified.

For example, when the poorly water-soluble material (1b) is a curcuminoid, its melting point is 191° C., and therefore, the kneading temperature can be 231° C. or lower, 220° C. or lower, 210° C. or lower, 200° C. or lower, 190° C. or lower, or 180° C. or lower.

That is, when the poorly water-soluble material (1b) is a curcuminoid, the temperature adopted for heating and kneading can be, for example, within the range of 100° C. to 231° C., within the range of 120° C. to 220° C., or within the range of 120° C. to 200° C.

The kneading step can also be a step of heating and kneading the above-mentioned poorly water-soluble material (1b) together with another component (4) in addition to the HPMC (2) and the polysaccharide (3).

In one aspect of the production method of the present disclosure, after the present solid composition containing the amorphized poorly water-soluble material (1a) is prepared by heating and kneading the poorly water-soluble material (1b), the HPMC (2), and the polysaccharide (3) in the kneading step, a step of cooling the present solid composition to a desired temperature such as room temperature can be included. Further, a step of crushing or pulverizing the thus obtained solid composition with a crusher, a pulverizer, or the like can also be included.

Further, in the production method of the present disclosure, the production can also be carried out by a method including a solid-liquid separation step (for example, a solvent precipitation method), a drying step (for example, a spray drying method, a freeze drying method, a vacuum drying method, or the like), a sizing step (sieving or the like), and/or a granulation step other than the method including the kneading step, or the cooling step or the crushing or pulverizing step. These methods can be carried out in accordance with a conventional method in the art.

<Use of Present Solid Composition>

The above-mentioned present solid composition can be used as it is as a raw material for an oral composition, a pharmaceutical product, a quasi-drug, a food or drink, an oral care product, or a cosmetic. Further, since the proportion of the poorly water-soluble material in an amorphous state (1a) contained in the present solid composition is extremely high, the present solid composition may be used by adding the same poorly water-soluble material (1b) raw material before amorphization thereto. In this manner, as the advantage of adding the raw material powder before amorphization, a point that the absorption amount can be easily adjusted when the absorbability of the amorphous preparation in the body is too high, a point that the physical property such as hygroscopicity of the powder can be easily adjusted, and the like are exemplified. In this case, the poorly water-soluble material (1) contained in the preparation, for example, may be prepared such that the mass ratio of the amorphous material to the crystalline material is in the range of 1:0.1 to 1:5, and preferably the amorphous material: the crystalline material=1:2.

Further, the present solid composition can be used for producing a desired pharmaceutical product, quasi-drug, food or drink, oral care product, or cosmetic by being arbitrarily mixed with another component (for example, a component of the pharmaceutical product, the quasi-drug, the food or drink, the oral care product, or the cosmetic, an additive therefor, or the like) as needed so as not to affect the amorphous state of the poorly water-soluble material (1a) contained therein.

Examples of another additive include, but are not limited to as described above, a binder, a disintegrant, a moisturizer lubricant, an excipient, a colorant, a flavoring agent, a fragrance, a perfume oil, a surfactant, a preservative, an antioxidant, a UV absorber, a moisturizer, and a pH adjusting agent. These components include those specified as additives in the pharmaceutical, quasi-drug, or food field.

More specifically, sucrose, fructose, a starch, cellulose, a dextrin, a gum arabic powder, a ghatti gum powder, methyl cellulose, crystalline cellulose, ethyl cellulose, polyvinylpyrrolidone, polyethylene glycol, talc, silicon dioxide, magnesium stearate, stearic acid, stearyl alcohol, hydroxypropyl starch, sodium carboxymethyl starch, an agar powder, carboxymethyl cellulose (calcium), an ester oil, a wax, a higher fatty acid, a higher alcohol, an anionic surfactant, a cationic surfactant, a nonionic surfactant, an amphoteric surfactant, and a polyhydric alcohol are exemplified.

In the above-mentioned food or drink, in addition to general foods or drinks, for example, health foods, foods with functional claims, health supplement foods (or supplements), nutritionally functional foods, nutritional supplement foods, foods for special dietary use, foods for specified health use, and the like are included without limitation. In addition, in the oral care product, for example, a dentifrice agent (a powder or a paste), a halitosis preventive/deodorant agent (a gum, a tablet, etc.), a periodontal disease preventive/ameliorating agent, and the like are included without limitation. In addition, in the cosmetic, for example, a functional cosmetic, a skin care product, a makeup product, a perfumery or cosmetic, a hair care product, and the like are included. The present solid composition itself or a final product containing the same can be a composition that is orally administered or orally ingested (example: an oral pharmaceutical product, or a food or drink), a composition to be applied into the oral cavity (example: an oral care product), a composition to be applied to the bronchus or lung, a composition to be administered to the eye, a composition to be administered to the ear, a composition to be applied to the nose, a composition to be applied to the rectum, a composition to be applied to the vagina, or a composition to be applied to the skin.

Examples of the form of a product containing the present solid composition include a tablet (including, for example, an uncoated tablet, a sugar-coated tablet, a multi-layer tablet, an orally disintegrating tablet, a chewable tablet, an effervescent tablet, a dispersible tablet, a soluble tablet, etc.), a capsule, a granule (including, for example, an effervescent granule), a powder, an oral jelly, a tablet for oral application (including, for example, a troche, a sublingual tablet, a buccal tablet, a mucoadhesive tablet, a gum, etc.), a spray for oral application, a semi-solid for oral application, a gargle, a preparation for dialysis (examples: a preparation for peritoneal dialysis and a preparation for hemodialysis), an inhalant (examples: an inhalation powder and inhalation aerosol), a suppository, a semi-solid for rectal use, an enema agent, an eye ointment, an ear drop, a nasal drop (a nasal powder), a vaginal tablet, a vaginal suppository, a topical solid (example: a topical powder), and a spray (examples: a topical aerosol and a pump spray). Further, the present solid composition can be prepared in the form of a liquid preparation by being mixed with a liquid before use. Such a preparation form includes an oral liquid (examples: an elixir, a suspension, an emulsion, and a limonade), a syrup (example: a preparation for a syrup), a spray for oral application, an inhalation liquid, an enema agent, a nasal drop, a topical liquid (examples: a liniment and a lotion), a spray (examples: a topical aerosol and a pump spray).

<Method for Calculating Proportion of Crystalline Material and/or Amorphous Material of Poorly Water-Soluble Material>

The calculation method (hereinafter referred to as "the present calculation method"), which is one aspect of the present disclosure can be advantageously used for calculating the proportion of the poorly water-soluble material in a crystalline and/or amorphous state contained in the poorly water-soluble material (1) in the solid composition containing the poorly water-soluble material (1), the HPMC (2), and the polysaccharide of 5 or more sugars (3) other than HPMC.

The solid composition includes the above-mentioned solid composition of the present invention, and a solid composition obtained by the above-mentioned production method of the present invention, and in addition thereto, also includes a solid composition produced by an amorphization method different from the production method of the present invention while containing the poorly water-soluble material (1), the HPMC (2), and the polysaccharide (3) in the same manner as the above-mentioned solid composition. Further, a solid composition prepared by separately adding (externally adding) the crystalline poorly water-soluble material (1b) to the solid composition obtained by the production method of the present invention is also included. The solid composition can be a pharmaceutical product, a quasi-drug, a food or drink, an oral care product, or a cosmetic, or can also be a material to be used by being added and mixed in each of these products.

Hereinafter, the solid composition to be measured by the present calculation method is referred to as "measurement solid composition" or "measurement sample". Note that the poorly water-soluble material (1), the HPMC (2), and the polysaccharide (3) that constitute the measurement solid composition (measurement sample) are as described above, and the above description can be incorporated herein.

The present calculation method can be carried out by the following steps (A) and (B):

(A) a step of determining an XRD analysis value in a chart obtained by analyzing the measurement solid composition (measurement sample) with a powder X-ray diffractometer; and (B) a step of calculating the proportion of the crystalline material (1a) and/or the amorphous material (1b) in the poorly water-soluble material contained in the measurement solid composition (measurement sample) by applying the XRD analysis value of (A) to a calibration curve prepared in advance.

Note that the calibration curve can be prepared by the following method.

(C) With respect to the poorly water-soluble material (1) contained in the measurement solid composition (measurement sample) as a target, an XRD analysis value of each standard sample is determined for mixtures (standard samples) in which the crystalline poorly water-soluble material (1b) is mixed in various proportions in a composition obtained by amorphizing the crystalline poorly water-soluble material (1b) using the production method of the present invention, and the proportion (%, theoretical value) of the crystalline poorly water-soluble material (1b) in the standard sample is plotted on the X axis and the XRD analysis value is plotted on the Y axis. On the X axis, in place of the proportion of the crystalline poorly water-soluble material (1b) in the standard sample, the proportion (%, theoretical value) of the crystalline material (1b) in the poorly water-soluble material (total amount) contained in the standard sample can also be plotted. Note that the XRD analysis value is as described above.

The step of preparing the calibration curve may be performed before the above-mentioned steps (A) and (B).

Because the present calculation method including the steps (A) and (B), or further including the step (C) in addition thereto can be used based on the fact that a solid composition in which the proportion of the amorphous material is extremely high can be prepared by the production method of the present invention, as shown in the below-mentioned Test Example 6, it is based on the fact that the XRD analysis value shows a positive correlation with the proportion of the crystalline material (1a) of the poorly water-soluble material contained in the solid composition or the proportion of the crystalline material (1a) in the poorly water-soluble material (1) with respect to a solid composition containing the poorly water-soluble material (1), the HPMC (2), and the polysaccharide (3). That is, by preparing the calibration curve that reflects the correlation of both in advance, when the XRD analysis value of the measurement sample is determined, by the calibration curve, the proportion of the crystalline material (1a) of the poorly water-soluble material or the proportion of the crystalline material (1a) in the poorly water-soluble material (1) contained in the measurement sample can be easily found. Further, if the proportion of the crystalline material (1a) (crystalline material content ratio %) in the poorly water-soluble material (1) is found, the proportion of the amorphous material (1b) (amorphous material content ratio %) in the poorly water-soluble material (1) can also be simultaneously found.

As the standard samples used in the above (A), two or more samples having a different mixing ratio may be prepared by appropriately selecting the mixing ratio within the following range: the composition in which the poorly water-soluble material is amorphized by the production method of the present invention: the crystalline poorly water-soluble material (1b)=1:0.1 to 1:10.

According to the present calculation method, it is possible to calculate the proportions of the crystalline material and/the amorphous material in the poorly water-soluble material contained in the solid composition, and evaluate or control the quality of the solid composition.

EXAMPLES

Hereinafter, the present invention will be described in more detail with reference to Test Examples, Examples, and the like. However, the present invention is not limited thereto, and many modifications can be made by those skilled in the art within the technical idea of the present invention. Note that unless otherwise stated, the following tests were performed at room temperature (25±5° C.) and under atmospheric pressure conditions. Further, unless otherwise stated, "%" means "mass %" and "part(s)" means "part (s) by mass".

The production method and the test method adopted in the following tests are as follows.
(1) Method for Producing Solid Composition
<Heating and Kneading Method>

All raw materials were uniformly mixed, and then heated and kneaded using an extruder (twin-screw extruder) (product: Process 11; manufactured by Thermo Fisher Scientific, Inc.) (the detailed conditions are as shown in Tables 2, 3, 5 to 8, 11 and 12).

After heating and kneading, the composition extruded and discharged in a rod state was pulverized using a pulverizer, whereby a solid composition in a powder form (median diameter: about 100 µm to 400 µm) was obtained. The particle size of the pulverized material was measured under the following measurement conditions using Microtrac MT3300EX II (manufactured by MicrotracBEL Corp.).
<Measurement Conditions for Particle Diameter>
  Measurement mode: Dry
  Dry feeder: Turbotrac One-Shot Dry
  Set Zero Time: 5 seconds
  Measurement time: 5 seconds
  Particle refractive index: 1.81
  Particle shape: non-spherical shape
(2) Test Method
(2-1) Content and Content Residual Ratio (%) of Poorly Water-Soluble Material Contained in Solid Composition The content of the poorly water-soluble material contained in the produced solid composition was measured, and the content ratio (measurement value (%)) in 100% of the solid composition was calculated. Note that the content of the poorly water-soluble material was measured by absorptiometry for astaxanthin and by the HPLC method for other poorly water-soluble materials.

As shown in the following formula, the obtained measurement value (%) was divided by the blend proportion (theoretical value (%)) at the time of production, and the percentage of the obtained value was taken as "the content residual ratio (%) of the poorly water-soluble material".

Content residual ratio (%) of poorly water-soluble material=[measurement value (%)/theoretical value (%)]×100

(a) Measurement of Curcumin Content
(i) Preparation of Measurement Sample and Standard Sample Curcumin 1 (Nagara Science Co., Ltd.) was dissolved in methanol, and then diluted to 0.4 to 40 µg/mL with a 50% acetonitrile aqueous solution, and the resultant was filtered through a 0.45 µm membrane filter, whereby a standard sample was prepared.

Further, the produced solid composition was diluted about 1000 to 1250 times with a 50% acetonitrile aqueous solution, and the resultant was filtered through a 0.45 µm membrane filter, whereby a measurement sample was prepared.

The standard sample and the measurement sample were analyzed by HPLC under the following conditions.
(ii) Measurement Conditions
  HPLC apparatus: Agilent 1220 Infinity II LC system (Agilent Technologies Japan, Ltd., the same applies hereinafter)
  Stationary phase: Atlantis T3 column (silica-based reverse phase $C_{18}$) (2.1×150 mm, 3 µm) (Waters, the same applies hereinafter)
  Mobile phase: a 0.1% (v/v) phosphoric acid-containing 50' (v/v) acetonitrile aqueous solution
  Flow rate: 0.5 mL/min
  Column temperature: 40° C.
(b) Measurement of Silymarin Content
(i) Preparation of Measurement Sample and Standard Sample Silybin (mixture of silybin A and silybin B) (Tokyo Chemical Industry Co., Ltd.) was dissolved in methanol, and then diluted to 0.4 to 40 µg/mL (in terms of the total amount of silybin) with a 35% methanol aqueous solution, and the resultant was filtered through a 0.45 µm membrane filter, whereby a standard sample was prepared.

Further, the produced solid composition was dissolved in a 65% methanol aqueous solution, and then diluted 1000 times with a 35% methanol aqueous solution, and the resultant was filtered through a 0.45 µm membrane filter, whereby a measurement sample was prepared.

The standard sample and the measurement sample were analyzed by HPLC under the following conditions.

The silymarin content was calculated using a calibration curve of a silybin standard sample containing 98.7% silybin (in terms of the total amount of silybin A and silybin B).
(ii) Measurement Conditions
  HPLC apparatus: Agilent 1220 Infinity II LC system,
  Stationary phase: Atlantis T3 column (2.1×150 mm, 3 µm)
  Mobile phase: A: a 0.2% (v/v) phosphoric acid aqueous solution, B: methanol
  Flow rate: 0.6 mL/min
  Column temperature: 40° C.
  Gradient condition of mobile phase: Table 1

TABLE 1

| Time (min) | % A | % B |
|---|---|---|
| 0 | 65 | 35 |
| 3 | 65 | 35 |
| 30 | 60 | 40 |

TABLE 1-continued

| Time (min) | % A | % B |
|---|---|---|
| 30.1 | 65 | 35 |
| 40 | 65 | 35 |

(c) Measurement of Luteolin Content
(i) Preparation of Measurement Sample and Standard Sample 3',4',5,7-Tetrahydroxyflavone (Tokyo Chemical Industry Co., Ltd.) was dissolved in ethanol, and then diluted to 0.4 to 40 µg/mL with a 40% acetonitrile aqueous solution, and the resultant was filtered through a 0.45 µm membrane filter, whereby a standard sample was prepared.

Further, the produced solid composition was dissolved in a 50% ethanol aqueous solution, and then diluted 1000 times with a 40% acetonitrile aqueous solution, and the resultant was filtered through a 0.45 µm membrane filter, whereby a measurement sample was prepared.

The standard sample and the measurement sample were analyzed by HPLC under the following conditions.

(ii) Measurement Conditions

HPLC apparatus: Agilent 1220 Infinity II LC system, Stationary phase: Atlantis T3 column (2.1×150 mm, 3 µm)

Mobile phase: a 0.1. (v/v) phosphoric acid-containing 40% (v/v) acetonitrile aqueous solution Flow rate: 0.3 mL/min Column temperature: 40° C.

(d) Measurement of Naringenin and Hesperetin Contents
(i) Preparation of Measurement Sample and Standard Sample Each of naringenin (Tokyo Chemical Industry Co., Ltd.) and hesperetin (Tokyo Chemical Industry Co., Ltd.) was dissolved in methanol, and then diluted to 0.4 to 40 µg/mL with a 20% acetonitrile aqueous solution, and the resultant was filtered through a 0.45 µm membrane filter, whereby a standard sample was prepared.

Further, the produced solid composition was dissolved in a 50% acetonitrile aqueous solution, and then diluted 1000 times with a 20% acetonitrile aqueous solution, and the resultant was filtered through a 0.45 µm membrane filter, whereby a measurement sample was prepared. The standard sample and the measurement sample were analyzed by HPLC under the following conditions.

(ii) Measurement Conditions

HPLC apparatus: Agilent 1220 Infinity II LC system, Stationary phase: Atlantis T3 column (2.1×150 mm, 3 µm)

Mobile phase: A: a 0.2% (v/v) phosphoric acid aqueous solution, B: acetonitrile

Flow rate: 0.6 mL/min

Column temperature: 40° C.

Gradient condition of mobile phase: Table 2

TABLE 2

| Time (min) | A | B |
|---|---|---|
| 0 | 80% | 20% |
| 0.1 | 80% | 20% |
| 12 | 60% | 40% |
| 12.1 | 80% | 20% |
| 17 | 80% | 20% |

(e) Measurement of Polymethoxyflavonoid (PMF) Content
(i) Preparation of Measurement Sample and Standard Sample Nobiletin (FUJIFILM Wako Pure Chemical Corporation) was dissolved in acetonitrile, and then diluted to 0.4 to 40 µg/mL with a 50% acetonitrile aqueous solution, and the resultant was filtered through a 0.45 µm membrane filter, whereby a standard sample was prepared.

Further, the produced solid composition was dissolved in acetonitrile, and then diluted 1250 times with a 50% acetonitrile aqueous solution, and the resultant was filtered through a 0.45 µm membrane filter, whereby a measurement sample was prepared.

The standard sample and the measurement sample were analyzed by HPLC under the following conditions.

The PMF content was calculated using a calibration curve of a nobiletin standard sample.

(ii) Measurement Conditions

HPLC apparatus: Agilent 1220 Infinity II LC system, Stationary phase: Atlantis T3 column (2.1×150 mm, 3 µm)

Mobile phase: a 0.1% (v/v) phosphoric acid-containing 50% (v/v) acetonitrile aqueous solution Flow rate: 0.5 mL/min Column temperature: 40° C.

(f) Measurement of Sesamin Content
(i) Preparation of Measurement Sample and Standard Sample Each of (+)-sesamin and (+)-episesamin (both from Nagara Science Co., Ltd.) was dissolved in methanol, and then diluted to about 0.4 to 40 µg/mL with a 70% methanol aqueous solution, and the resultant was filtered through a 0.45 µm membrane filter, whereby a standard sample was prepared.

Further, the produced solid composition was dissolved in a 50% methanol aqueous solution, and then diluted 1000 times with a 70% methanol aqueous solution, and the resultant was filtered through a 0.45 µm membrane filter, whereby a measurement sample was prepared.

The standard sample and the measurement sample were analyzed by HPLC under the following conditions.

Each of the (+)-sesamin content and the (+)-episesamin content was calculated and the total value was taken as the sesamin content.

(ii) Measurement Conditions

HPLC apparatus: JASCO LC-2000 Plus series system (JASCO Corporation)

Stationary phase: L-column 2 ODS column (4.6×250 mm, 5 µm) (Chemicals Evaluation and Research Institute)

Mobile phase: a 70% (v/v) methanol aqueous solution

Flow rate: 1.0 mL/min

Column temperature: 30° C.

(g) Measurement of Resveratrol Content
(i) Preparation of Measurement Sample and Standard Sample Resveratrol (FUJIFILM Wako Pure Chemical Corporation) was dissolved in methanol, and then diluted to 0.4 to 40 µg/mL with a 25% acetonitrile aqueous solution, and the resultant was filtered through a 0.45 µm membrane filter, whereby a standard sample was prepared.

Further, the produced solid composition was dissolved in a 50% methanol aqueous solution, and then diluted 1000 times with a 50% acetonitrile aqueous solution, and the resultant was filtered through a 0.45 µm membrane filter, whereby a measurement sample was prepared.

The standard sample and the measurement sample were analyzed by HPLC under the following conditions.

(ii) Measurement Conditions

HPLC apparatus: Agilent 1220 Infinity II LC system

Stationary phase: Atlantis T3 column (2.1×150 mm, 3 μm)

Mobile phase: a 0.15% (v/v) phosphoric acid-containing 25% (v/v) acetonitrile aqueous solution Flow rate: 0.6 mL/min Column temperature: 40° C.

(h) Measurement of Astaxanthin Content

The total carotenoid content contained in the solid composition after production was measured by absorptiometry.

(i) Preparation of Measurement Sample

The produced solid composition was weighed in a specific amount (weighed out sample amount) and diluted 2500 to 5000 times with 1.2 mM BHT (dibutylhydroxytoluene)-containing acetone, and the resultant was filtered through a 0.2 μm membrane filter, whereby a measurement sample was prepared.

(ii) Measurement Conditions

The absorbance of the measurement sample was measured using a spectrophotometer JASCO V-660DS (manufactured by JASCO Corporation). Specifically, an absorbance A at the maximum absorption wavelength near a wavelength of 474 nm was measured using 1.2 mM BHT-containing acetone as a control solution, and the proportion (%) of total carotenoids contained in the measurement sample was calculated according to the following formula.

$$\text{Total carotenoid content ratio (\%)} = (\text{absorbance } A \times \text{dilution factor})/(\text{weighed out sample amount } (g) \times 2100 \text{ [extinction coefficient]}) \quad [\text{Math. 1}]$$

(2-2) Evaluation of Amorphous Property of Solid Composition

<Powder X-Ray Diffractometer (XRD) Analysis>

The crystalline property of the solid composition was evaluated by an XRD analysis of each of the samples immediately after production (initial stage) and after storage for 1 week to 1 month after production (after storage). Note that the storage was performed by leaving the solid composition immediately after production in a state where it is stored in a low-density polyethylene bag (trade name "Unipack A-8", manufactured by Seisan Nipponsha Ltd.) at 40° C. or 60° C. and a relative humidity of 75% or normal humidity (relative humidity: 45 to 85%) under dark conditions for 1 week to 1 month.

(i) Measurement Conditions

The above produced solid composition immediately after production and the solid composition after storage were subjected to the following powder X-ray diffractometer.

Powder X-ray diffractometer: Smart Lab (Rigaku Corporation)

Condition: convergence method

X-ray output: 3 kW range: 5 to 60°

Step width: 0.05°

Detector: D/teX Ultra 250

Optical system: CBO-E (for convergence method) analysis software: Smart Lab Studio II From the obtained XRD analysis results, according to the following criteria, the area (S2) of a sharp peak (a peak derived from the poorly water-soluble material (1b) in a crystalline state) in the range of 2θ=5 to 60°, and the total area ((S1)+(S2)) of the area (S2) and the area of a halo peak (S1) were calculated using software PDXL II (Rigaku Corporation) according to the manual. Based on the XRD analysis value calculated by applying these values to the following formula, the degree of amorphization was evaluated according to the following criteria.

[XRD Analysis Value]

$$\{(S2)/((S1)+(S2))\} \times 100(\%)$$

[Evaluation Criteria for Degree of Amorphization]

A: The XRD analysis value is 1.0% or less.

B: The XRD analysis value is more than 1.0% and 4.0% or less.

C: The XRD analysis value is more than 4.0%.

(2-3) Evaluation of Appearance of Solid Composition

The appearance (color change, presence or absence of caking, and presence or absence of solidification) of the solid composition was evaluated. The evaluation was performed visually for each of the samples immediately after production (initial stage) and after storage for 1 week to 1 month after production (after storage). Here, the "caking" means a state where the powder is solidified but returns to a powder form when it is broken up, and the "solidification" means a state where the powder is stuck even when it is tried to be broken up and remains in a mass, and the mass does not return to the powder. Note that the storage conditions other than the period are the same as those for the evaluation of the crystalline property.

Test Example 1 (Examples 1 to 4, and Comparative Examples 1 to 5)

Solid compositions in a powder form (Examples 1 to 4, Example 1', and Comparative Example 1 to 5) were produced by blending respective materials in respective proportions as shown in Table 4 using the above-mentioned heating and kneading method and a pulverizer. The description of the materials used and the details thereof are shown in the following Table 3.

TABLE 3

| Description | Contents | Trade name | Manufacturer |
|---|---|---|---|
| CUR raw material | Turmeric extract powder (containing 91% curcumin [MW: 368]) | Curcumin raw material | San-Ei Gen F.F.I., Inc. |
| HPMC1 | Hydroxypropylmethyl cellulose Viscosity*: 2.4 to 3.6 mm²/s | METOLOSE SE03 | Shin-Etsu Chemical Co., Ltd. |
| HPMC2 | Hydroxypropylmethyl cellulose Viscosity*: 4.8 to 7.2 mm²/s | METOLOSE SE06 | Shin-Etsu Chemical Co., Ltd. |
| HPC1 | Hydroxypropyl cellulose (MW: 100,000) | Celny SL | Nippon Soda Co., Ltd. |
| HPC2 | Hydroxypropyl cellulose (MW: 140,000) | Celny L | Nippon Soda Co., Ltd. |
| Gum arabic | Gum arabic (weight average molecular weight: about 200,000) | Gum arabic | San-Ei Gen F.F.I., Inc. |

TABLE 3-continued

| Description | Contents | Trade name | Manufacturer |
|---|---|---|---|
| Reduced palatinose | Isomaltulose reduced product (MW: 344.31) | Palatinit (registered trademark) | Mitsui Sugar Co., Ltd. |
| Polysorbate 80 | Polyoxyethylene sorbitan monooleate, Tween 80 (MW: 1309.68) | NIKKOL TO-10F | Nikko Chemicals Co., Ltd. |
| Raffinose | Raffinose (MW: 504.44) | Raffinose 100 | Nippon Beet Sugar Manufacturing Co., Ltd. |

*Viscosity of 2% aqueous solution at 20° C.

TABLE 4

| Material | | Example 1 | Example 1' | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|---|---|
| CUR raw material (calculated in terms of curcumin) | | 18.75 (17.1) | 22.5 (20.5) | 18.75 (17.1) | 18.75 (17.1) | 18.75 (17.1) | 18.75 (17.1) | 18.75 (17.1) | 18.75 (17.1) | 25 (22.8) | 18.75 (17.1) |
| HPMC1 | | 56.25 | 52.5 | 56.25 | | | 56.25 | 56.25 | 56.25 | | 56.25 |
| HPMC2 | | | | | 56.25 | 56.25 | | | | | |
| HPC1 [1] | | 10 | | | 10 | | | | | | |
| HPC2 [1'] | | | 10 | | | | | | | | |
| Gum arabic [2] | | 15 | 15 | 25 | 15 | 25 | | | | | |
| Reduced palatinose [3] | | | | | | | 25 | | | | |
| Polysorbate 80 [4] | | | | | | | | 25 | | | |
| λ-carrageenan [5] | | | | | | | | | | 28 | |
| Maltose [6] | | | | | | | | | 25 | 47 | |
| Raffinose [7] | | | | | | | | | | | 25 |
| Total | | 100 | 100 | 100 | 100 | 100 | 100 | 100 | 100 | 100 | 100 |
| Temperature | Zone 2 | 80 | 70 | 70 | 80 | 80 | 70 | 70 | 80 | 80 | 80 |
| | Zone 3 | 120 | 120 | 120 | 140 | 140 | 120 | 120 | 120 | 120 | 120 |
| | Zone 4 | 200 | 200 | 200 | 200 | 200 | 200 | 200 | 180 | 120 | 180 |
| | Zone 5 | 200 | 200 | 200 | 200 | 200 | 200 | 200 | 180 | 120 | 180 |
| | Zone 6 | 200 | 200 | 200 | 200 | 200 | 200 | 200 | 180 | 120 | 180 |
| | Zone 7 | 200 | 200 | 200 | 200 | 200 | 200 | 200 | 180 | 120 | 180 |
| | Zone 8 | 200 | 200 | 200 | 200 | 200 | 200 | 200 | 180 | 120 | 180 |
| | Die | 200 | 200 | 200 | 200 | 200 | 200 | 200 | 180 | 120 | 180 |
| Approximate heating time | | ca. 2 min | ca. 4 min | ca. 2 min | ca. 2 min | ca. 2 min | ca. 2 min | ca. 2 min | ca. 2 min | ca. 2 min | ca. 2 min |

Molecular weight:
[1] 100,000*
[1'] 140,000,
[2] 200,000 to 580,000,
[3] 344.31,
[4] 1309.68,
[5] 990 kDa,
[6] 342.3,
[7] 504.44

With respect to these solid compositions, the content (content residual ratio) of the poorly water-soluble material (1), evaluation of the degree of amorphization, and evaluation of the appearance were performed by the above-mentioned methods (FIGS. 1-1 and 1-2).

As shown in FIG. 1-1, it was confirmed that in the solid compositions (Examples 1 to 4, and Example 1') produced using gum arabic or using gum arabic and HPC in combination as the polysaccharide (3), curcumin (poorly water-soluble material) blended as a material was highly amorphized. Further, the amorphous property of the curcumin was stable over a long period of time. In addition, there was no significant change in appearance (color change, or presence or absence of caking or solidification), and the physical properties were also stable. On the other hand, as shown in FIG. 1-2, the solid compositions (Comparative Examples 1 and 5) produced using reduced palatinose, which is a disaccharide, or raffinose, which is a trisaccharide, in place of the polysaccharide (3) had a good amorphous property immediately after production, but many peaks of recrystallized materials of curcumin were observed after storage, and also a change in appearance (caking) was observed. Further, the solid composition (Comparative Example 3) produced similarly using maltose, which is a disaccharide, in place of the polysaccharide (3), or the solid composition (Comparative Example 2) produced using polysorbate 80, which is a surfactant, a peak of a crystallized material of curcumin was observed immediately after preparation, and after storage, the peak became prominent and also changes in appearance (caking and browning) were observed. Further, also in the solid composition (Comparative Example 4) produced without blending the HPMC (2), a peak of a crystallized material of curcumin was observed immediately after preparation, and after storage, the peak became prominent and also changes in appearance (caking and browning) were observed. Therefore, it was determined that Comparative Examples 1 to 5 are solid compositions that did not exert the effect of the present invention without calculating the XRD analysis value.

From the above results, it was confirmed that in order to stably amorphize the poorly water-soluble material (1b) in a state of maintaining a high content ratio, it is effective to use the polysaccharide (3) such as gum arabic or HPC and the HPMC (2) in combination when the poorly water-soluble material (1b) is heated and kneaded, that is, to heat and knead the poorly water-soluble material (1b) in the presence of the polysaccharide (3) and the HPMC (2).

Test Example 2 (Examples 5 to 12)

Respective solid compositions (Examples 5 to 12) were produced by blending materials shown in Table 5 in respective proportions using the above-mentioned production method (heating and kneading method).

TABLE 5

| Material | | Example 5 | 6 | 7 | 8 | 9 | 10 | 11 | 12 |
|---|---|---|---|---|---|---|---|---|---|
| CUR raw material (calculated in terms of curcumin) | | 60 (54.7) | 60 (54.7) | 5 (4.6) | 5 (4.6) | 7.5 (6.8) | 7.5 (6.8) | 5 (4.6) | 5 (4.6) |
| HPMC1 | | 36 | 36 | 90 | 90 | 67.5 | 67.5 | 20 | 20 |
| HPC1 [1] | | | 2 | | 2.5 | | 10 | 25 | 50 |
| Gum arabic [2] | | 4 | 2 | 5 | 2.5 | 25 | 15 | 50 | 25 |
| Total | | 100 | 100 | 100 | 100 | 100 | 100 | 100 | 100 |
| Temperature | Zone 2 | 80 | 80 | 80 | 80 | 80 | 80 | 80 | 80 |
| | Zone 3 | 120 | 120 | 120 | 120 | 120 | 120 | 120 | 120 |
| | Zone 4 | 200 | 200 | 200 | 200 | 200 | 200 | 200 | 200 |
| | Zone 5 | 200 | 200 | 200 | 200 | 200 | 200 | 200 | 200 |
| | Zone 6 | 200 | 200 | 200 | 200 | 200 | 200 | 200 | 200 |
| | Zone 7 | 200 | 200 | 200 | 200 | 200 | 200 | 200 | 200 |
| | Zone 8 | 200 | 200 | 200 | 200 | 200 | 200 | 200 | 200 |
| | Die | 200 | 200 | 200 | 200 | 200 | 200 | 200 | 200 |
| Approximate heating time | | ca. 2 min | ca. 2 min | ca. 2 min | ca. 2 min | ca. 2 min | ca. 2 min | ca. 2 min | ca. 8 min |

Molecular weight:
[1] 100,000,
[2] 200,000 to 580,000

With respect to these solid compositions, the content (content residual ratio) of the poorly water-soluble material, evaluation of the degree of amorphization, and evaluation of the appearance were performed by the above-mentioned methods (FIGS. 2-1 and 2-2).

As shown in FIG. 2, it was confirmed that in the solid compositions (Examples 5 to 12) produced using gum arabic or using gum arabic and HPC in combination as the polysaccharide (3), curcumin (poorly water-soluble material) blended as a material was highly amorphized. In the compositions of Examples 5, 6, 11, and 12, caking was observed after storage, but from the results of the XRD analysis, in any of Examples 5 to 12, a crystalline material of curcumin was not observed, and the amorphous state was maintained.

From the results of Test Examples 1 and 2, it was confirmed that in a solid composition prepared so that in the solid composition, the content of curcumin (the poorly water-soluble material (1b)) is from 4 to 60', the content of the HPMC (2) is from 20 to 90%, and the content of the polysaccharide (3) is from 4 to 75%, and the ratios of the respective components fall within the following ranges (1) to (3) (mass ratio), curcumin can be favorably amorphized by a heating and kneading method while containing curcumin in a high proportion.

(1) poorly water-soluble material (1b):HPMC (2)=1:0.5 to 1:20
(2) poorly water-soluble material (1b):polysaccharide (total with HPMC)=1:0.05 to 1:20
(3) HPMC (2):polysaccharide (3) other than HPMC=1: 0.05 to 1:5

Further, it was confirmed that a solid composition in which the physical stability is excellent and the changes in appearance after storage are suppressed is obtained by performing the preparation so that the ratios of the respective components further fall within the following ranges (1') to (3') (mass ratio) in these ranges.

(1') poorly water-soluble material (1b):HPMC (2)=1:3 to 1:20
(2') poorly water-soluble material (1b):polysaccharide (total with HPMC)=1:1 to 1:5
(3') HPMC (2):polysaccharide (3) other than HPMC=1: 0.05 to 1:0.5

Test Example 3 (Examples 13 to 38)

Various types of solid compositions (Examples 13 to 38) were produced in the same manner as in Test Example 1 using other various types of polysaccharides (3) in place of gum arabic used in Test Examples 1 and 2, and the presence or absence of amorphization of curcumin (poorly water-soluble material) and the storage stability (amorphous property and changes in appearance) of the solid compositions were evaluated.

Specifically, the respective solid compositions in a powder form (Examples 13 to 38) were produced by blending materials shown in the following Tables 7 to 10 in respective proportions using the above-mentioned heating and kneading method and a pulverizer. The details of the materials used are shown in the following Table 6.

TABLE 6

| Description | Contents (molecular weight) [1] | Trade name | Manufacturer |
| --- | --- | --- | --- |
| Guar gum decomposition product | Guar gum decomposition product (MW: about 20,000*) | Sunfiber ® | Taiyo Kagaku Co., Ltd. |
| Soybean polysaccharide | Soybean polysaccharide (MW: about 400,000) | SM-700 | San-Ei Gen F.F.I., Inc. |
| HM pectin | HM pectin (MW: about 2,090,000) | SM-666 | San-Ei Gen F.F.I., Inc. |
| Tamarind seed gum | Tamarind seed gum (MW: about 7,160,000) | Bistop ® D-2032 | San-Ei Gen F.F.I., Inc. |
| Low-molecular weight ghatti gum | Ghatti gum (MW: about 150,000) | Ghatti gum | San-Ei Gen F.F.I., Inc. |
| Pullulan | Pullulan (MW: about 580,000) | Food additive pullulan fine powder | Hayashibara |
| CMC | Carboxymethyl cellulose sodium (MW: 7,630,000) | Cellogen ® F | DKS Co. Ltd. |
| Fermented cellulose preparation | Fermented cellulose preparation (blended with 20% fermented cellulose) | San Artist ® PG | San-Ei Gen F.F.I., Inc. |
| Microcrystalline cellulose | Microcrystalline cellulose preparation (blended with 75.0% microcrystalline cellulose) | Seoras® RC-N30 | Asahi Kasei Corporation |
| Dextrin | Dextrin (MW: about 13,000*) | Dextrin NSD 500 | San-ei Sucrochemical Co., Ltd. |
| Indigestible dextrin | Indigestible dextrin (MW: about 2,000*) | Fibersol ® 2 | Matsutani Chemical Industry Co., Ltd. |
| α-CD | α-cyclodextrin (MW: about 972*) | CAVAMAX ® W6 FOOD | Wacker Chemical |
| γ-CD | γ-cyclodextrin (MW: about 1,297*) | CAVAMAX ® W8 FOOD | Wacker Chemical |
| Processed starch | Starch sodium octenyl succinate (MW > 10,000*) | PURITY GUM ® BE | Ingredion |
| λ-carrageenan | λ-carrageenan (MW: about 990 kDa*) | Carrageenin CSL-1 | San-Ei Gen F.F.I., Inc. |

[1] Those indicated with * show literature data, and the others show actual measurement values (weight average molecular weight (Mw).

TABLE 7

| Material | | Example 13 | 14 | 15 | 16 | 17 | 18 | 19 | 20 |
| --- | --- | --- | --- | --- | --- | --- | --- | --- | --- |
| CUR raw material | | 18.75 | 18.75 | 18.75 | 18.75 | 18.75 | 18.75 | 18.75 | 18.75 |
| (calculated in terms of curcumin) | | (17.1) | (17.1) | (17.1) | (17.1) | (17.1) | (17.1) | (17.1) | (17.1) |
| HPMC1 | | 56.25 | 56.25 | 56.25 | 56.25 | 56.25 | 56.25 | 56.25 | 56.25 |
| HPC1 | | 10 | | 10 | | 10 | | 10 | |
| Guar gum decomposition product | | 15 | 25 | | | | | | |
| Soybean polysaccharide | | | | 15 | 25 | | | | |
| HM pectin | | | | | | 15 | 25 | | |
| Tamarind seed gum | | | | | | | | 15 | 25 |
| Total | | 100 | 100 | 100 | 100 | 100 | 100 | 100 | 100 |
| Temperature | Zone 2 | 80 | 80 | 80 | 80 | 80 | 80 | 80 | 80 |
| | Zone 3 | 140 | 140 | 140 | 140 | 140 | 140 | 140 | 140 |
| | Zone 4 | 200 | 200 | 200 | 200 | 200 | 200 | 200 | 200 |
| | Zone 5 | 200 | 200 | 200 | 200 | 200 | 200 | 200 | 200 |
| | Zone 6 | 200 | 200 | 200 | 200 | 200 | 200 | 200 | 200 |
| | Zone 7 | 200 | 200 | 200 | 200 | 200 | 200 | 200 | 200 |
| | Zone 8 | 200 | 200 | 200 | 200 | 200 | 200 | 200 | 200 |
| | Die | 200 | 200 | 200 | 200 | 200 | 200 | 200 | 200 |
| Approximate heating time | | ca. 2 min | ca. 2 min | ca. 2 min | ca. 2 min | ca. 2 min | ca. 2 min | ca. 2 min | ca. 2 min |

TABLE 8

| Material | | Example | | | | | | | |
|---|---|---|---|---|---|---|---|---|---|
| | | 21 | 22 | 23 | 24 | 25 | 26 | 27 | 28 |
| CUR raw material | | 18.75 | 18.75 | 18.75 | 18.75 | 18.75 | 18.75 | 18.75 | 18.75 |
| (calculated in terms of curcumin) | | (17.1) | (17.5) | (17.1) | (17.1) | (17.1) | (17.1) | (17.1) | (17.1) |
| HPMC1 | | 56.25 | 56.25 | 56.25 | 56.25 | 56.25 | 56.25 | 56.25 | 56.25 |
| HPC1 | | 10 | | 10 | | 10 | | 10 | |
| Ghatti gum | | 15 | 25 | | | | | | |
| Pullulan | | | | 15 | 25 | | | | |
| Indigestible dextrin | | | | | | 15 | 25 | | |
| CMC | | | | | | | | 15 | 25 |
| Total | | 100 | 100 | 100 | 100 | 100 | 100 | 100 | 100 |
| Temperature | Zone 2 | 80 | 80 | 80 | 80 | 80 | 80 | 80 | 80 |
| | Zone 3 | 140 | 140 | 140 | 140 | 140 | 140 | 140 | 140 |
| | Zone 4 | 200 | 200 | 200 | 200 | 200 | 200 | 200 | 200 |
| | Zone 5 | 200 | 200 | 200 | 200 | 200 | 200 | 200 | 200 |
| | Zone 6 | 200 | 200 | 200 | 200 | 200 | 200 | 200 | 200 |
| | Zone 7 | 200 | 200 | 200 | 200 | 200 | 200 | 200 | 200 |
| | Zone 8 | 200 | 200 | 200 | 200 | 200 | 200 | 200 | 200 |
| | Die | 200 | 200 | 200 | 200 | 200 | 200 | 200 | 200 |
| Approximate heating time | | ca. 2 min | ca. 2 min | ca. 2 min | ca. 2 min | ca. 2 min | ca. 2 min | ca. 2 min | ca. 2 min |

TABLE 9

| Material | | Example | | | | | | | |
|---|---|---|---|---|---|---|---|---|---|
| | | 29 | 30 | 31 | 32 | 33 | 34 | 35 | 36 |
| CUR raw material | | 18.75 | 18.75 | 18.75 | 18.75 | 18.75 | 18.75 | 22.5 | 22.5 |
| (calculated in terms of curcumin) | | (17.1) | (17.1) | (17.1) | (17.1) | (17.1) | (17.1) | (20.5) | (20.5) |
| HPMC1 | | 56.25 | 56.25 | 56.25 | 56.25 | 56.25 | 56.25 | 52.5 | 52.5 |
| HPC1 | | 10 | | 10 | | 10 | 10 | | |
| Microcrystalline cellulose | | 15 | 25 | | | | | | |
| Fermented cellulose preparation | | | | 15 | 25 | | | | |
| (Fermented cellulose content) | | | | (3) | (5) | | | | |
| α-CD | | | | | | 15 | | | |
| γ-CD | | | | | | | 15 | | |
| Processed starch | | | | | | | | 25 | |
| Dextrin | | | | | | | | | 25 |
| Total | | 100 | 100 | 100 | 100 | 100 | 100 | 100 | 100 |
| Temperature | Zone 2 | 80 | 80 | 80 | 80 | 80 | 80 | 70 | 70 |
| | Zone 3 | 140 | 140 | 140 | 140 | 140 | 140 | 120 | 120 |
| | Zone 4 | 200 | 200 | 200 | 200 | 200 | 200 | 200 | 200 |
| | Zone 5 | 200 | 200 | 200 | 200 | 200 | 200 | 200 | 200 |
| | Zone 6 | 200 | 200 | 200 | 200 | 200 | 200 | 200 | 200 |
| | Zone 7 | 200 | 200 | 200 | 200 | 200 | 200 | 200 | 200 |
| | Zone 8 | 200 | 200 | 200 | 200 | 200 | 200 | 200 | 200 |
| | Die | 200 | 200 | 200 | 200 | 200 | 200 | 200 | 200 |
| Approximate heating time | | ca. 2 min | ca. 2 min | ca. 2 min | ca. 2 min | ca. 2 min | ca. 2 min | ca. 8 min | ca. 8 min |

TABLE 10

| Material | | Example | |
|---|---|---|---|
| | | 37 | 38 |
| CUR raw material | | 18.75 | 18.75 |
| (calculated in terms of curcumin) | | (17.1) | (17.1) |
| HPMC1 | | 56.25 | 56.25 |
| HPC1 | | 10 | |
| λ-carrageenan | | 15 | 25 |
| Total | | 100 | 100 |
| Temperature | Zone 2 | 80 | 80 |
| | Zone 3 | 140 | 140 |
| | Zone 4 | 200 | 200 |
| | Zone 5 | 200 | 200 |
| | Zone 6 | 200 | 200 |
| | Zone 7 | 200 | 200 |
| | Zone 8 | 200 | 200 |
| | Die | 200 | 200 |
| Approximate heating time | | ca. 2 min | ca. 2 min |

With respect to these solid compositions, the content (content residual ratio) of curcumin (poorly water-soluble material), evaluation of the degree of amorphization, and evaluation of the appearance were performed by the above-mentioned methods (FIGS. 3-1 to 3-7).

As shown in FIGS. 3-1 to 3-7, it was confirmed that in the solid compositions (Examples 13 to 38) produced using the HPMC (2) and the polysaccharide (molecular weight: 972 or more) (3) in combination, curcumin (the poorly water-soluble material (1b)) blended as a material was highly amorphized. Further, the amorphous property of the curcumin was stable over a long period of time. In the solid compositions (Examples 37 and 38) produced using λ-carrageenan, a slight change in appearance (caking) due to storage was observed, but in the solid compositions (Examples 13 to 36) produced using the other polysaccharides (3), there was almost no change in appearance (color change, or presence or absence of caking or solidification), and the physical properties were also stable. Further, it was confirmed that a peak of a crystalline material observed in the XRD analysis of Examples 33 and 34 is derived from a dextrin, and not derived from curcumin (data not shown).

Test Example 4 (Examples 39 to 50 and Comparative Example 6)

Various types of solid compositions (Examples 39 to 50 and Comparative Example 6) were produced in the same manner as in Test Example 1 using another poorly water-soluble material in place of curcumin used in Test Examples 1 to 3 as the poorly water-soluble material, and the presence or absence of amorphization of various types of poorly water-soluble materials and the storage stability (amorphous property and changes in appearance) of the solid compositions were evaluated.

Specifically, the respective solid compositions in a powder form (Examples 39 to 50 and Comparative Example 6) were produced by blending materials shown in Tables 12 to 13 in respective proportions using the above-mentioned production method (heating and kneading method). The details of the materials used are shown in Table 11.

TABLE 11

| Description | Contents (molecular weight) | Tg/Tm [1] | Trade name | Manufacturer |
| --- | --- | --- | --- | --- |
| Naringenin | Naringenin (MW: 272) | 87.7° C./253.7° C. | NF01 | Interquim |
| Hesperetin | Hesperetin (MW: 302) | 81.1° C./231.3° C. | Hesperetin | San-Ei Gen F.F.I., Inc. |
| Silymarin | Silymarin (silybin content: 31.4%) | about 116.7° C./142.3° C. | Silymarin | San-Ei Gen F.F.I., Inc. |
| Luteolin | Luteolin (MW: 286) | 174.6° C./339.4° C. | Luteorin | Xi'an Felda Bio-tec |
| Resveratrol | Resveratrol (MW: 228) | 129.4° C./266.7° C. | resVida ® | DSM |
| Astaxanthin | Astaxanthin (MW: 597) | about 78.8° C./219.8° C. | Astaxanthin | San-Ei Gen F.F.I., Inc. |
| PMF | Polymethoxyflavone (content as total amount of 5,6,7,4'-tetramethoxyflavone, tangeretin, sinensetin, nobiletin, 3,5,6,7,3',4'-hexamethoxyflavone, and 3,5,6,7,8,3',4'-heptamethoxyflavone: about 72%) (average MW: about 400) | No data/102.2° C. | PMF | San-Ei Gen F.F.I., Inc. |
| Cholecalciferol | Cholecalciferol | No data/about 88° C. | Cholecalciferol | DSM |
| Sesamin | Sesamin (MW: 354) | 66.3° C./100.1° C. | Sesamin | San-Ei Gen F.F.I., Inc. |

TABLE 12

| Material | | 39 | 40 | 41 | 42 | 43 | 44 | 45 |
| --- | --- | --- | --- | --- | --- | --- | --- | --- |
| Silymarin | | 22.5 | 22.5 | | | | | |
| Luteolin | | | | 15 | 15 | | | |
| Resveratrol | | | | | | 18.75 | | |
| Naringenin | | | | | | | 22.5 | |
| Hesperetin | | | | | | | | 22.5 |
| HPMC1 | | 52.5 | 52.5 | 60 | 60 | 56.25 | 52.5 | 52.5 |
| HPC1 | | 10 | | 15 | | | | |
| Gum arabic | | 15 | 25 | 10 | 25 | 25 | 25 | 25 |
| Total | | 100 | 100 | 100 | 100 | 100 | 100 | 100 |
| Temperature | Zone 2 | 80 | 80 | 80 | 80 | 80 | 80 | 80 |
| | Zone 3 | 140 | 120 | 120 | 120 | 140 | 140 | 140 |
| | Zone 4 | 190 | 170 | 230 | 230 | 230 | 230 | 230 |
| | Zone 5 | 190 | 170 | 230 | 230 | 230 | 230 | 230 |
| | Zone 6 | 190 | 170 | 230 | 230 | 230 | 230 | 230 |
| | Zone 7 | 190 | 170 | 230 | 230 | 230 | 230 | 230 |
| | Zone 8 | 190 | 170 | 230 | 230 | 230 | 230 | 230 |
| | Die | 190 | 170 | 230 | 230 | 230 | 230 | 230 |
| Approximate heating time | | ca. 2 min | ca. 8 min | ca. 8 min | ca. 8 min | ca. 2 min | ca. 2 min | ca. 2 min |

TABLE 13

| Material | | Example 46 | Example 47 | Example 48 | Example 49 | Example 50 | Comparative Example 6 |
|---|---|---|---|---|---|---|---|
| Astaxanthin | | | | | | 10.99 | 10.99 |
| PMF | | 22.5 | 22.5 | | | | |
| Cholecalciferol | | | | 20 | | | |
| Sesamin | | | | | 22.5 | | |
| HPMC1 | | 52.5 | 52.5 | 20 | 52.5 | 64.01 | 64.01 |
| HPC1 | | 10 | | 50 | | 10 | |
| Gum arabic | | 15 | 25 | 10 | 25 | 15 | |
| Polysorbate 80 | | | | | | | 25 |
| Total | | 100 | 100 | 100 | 100 | 100 | 100 |
| Temperature | Zone 2 | 80 | 80 | 60 | 100 | 80 | 80 |
| | Zone 3 | 140 | 140 | 100 | 130 | 140 | 140 |
| | Zone 4 | 180 | 180 | 100 | 165 | 200 | 200 |
| | Zone 5 | 180 | 180 | 100 | 165 | 200 | 200 |
| | Zone 6 | 180 | 180 | 100 | 165 | 200 | 200 |
| | Zone 7 | 180 | 180 | 100 | 165 | 200 | 200 |
| | Zone 8 | 180 | 180 | 100 | 165 | 200 | 200 |
| | Die | 180 | 180 | 100 | 165 | 200 | 200 |
| Approximate heating time | | ca. 2 min | ca. 2 min | ca. 2 min | ca. 2 min | ca. 5 min | ca. 5 min |

With respect to these solid compositions, the content (content residual ratio) of the poorly water-soluble material, evaluation of the degree of amorphousness, and evaluation of the appearance were performed by the above-mentioned methods (FIGS. 4-1 to 4-4).

As shown in FIGS. 4-1 to 4-4, it was confirmed that in the solid compositions (Examples 39 to 50) produced using the polysaccharide (molecular weight: 972 or more) (3) and the HPMC (2) in combination, any of the poorly water-soluble materials (1b) blended as a material was highly amorphized. Further, the amorphous property of any of the poorly water-soluble materials was stable over a long period of time.

Note that with respect to astaxanthin, the amorphous state was maintained for a long period of time in the combination with HPMC and polysorbate, but the residual ratio in the sample extremely decreased to as low as 46%, and a color change after storage was observed (Comparative Example 6). Since astaxanthin has a high value as an edible pigment, the astaxanthin composition of the present invention (Example 50) was excellent in that a color change after storage was not caused and the stability in the composition was high.

Test Example 5 (Comparative Examples 7 and 8)

(1) Preparation of CUR-Containing Preparation by Organic Solvent Method

To 300 mL of a 70% ethanol aqueous solution, respective components were added in proportions shown in Table 14 and stirred until the CUR raw material was dissolved while heating to 80° C. While maintaining the mixed liquid at 80° C., the mixed liquid was dried under reduced pressure using an evaporator (Rotary Evaporator N-1300, EYELA Co., Ltd.) to remove the solvent. The obtained dried material was pulverized with a mortar and a pestle and subjected to an XRD analysis under the above conditions.

TABLE 14

| Material (g) | Comparative Example 7 | Comparative Example 8 |
|---|---|---|
| CUR raw material (calculated in terms of curcumin) | 4.5 (4.1) | 4.5 (4.1) |
| HPMC1 | | 4.5 |
| HPMC2 | 4.5 | |
| Dextrin NSD 300 (San-ei Sucrochemical Co., Ltd.) | 18 | 18 |
| Total (g) | 27 | 27 |

(2) Preparation of Amorphous Preparation Using CUR Alone by Heating and Kneading (Melting)

Only the CUR raw material was heated and kneaded using an extruder until it melted, and the amorphized material was cooled, and then pulverized with a mortar and a pestle, and a preparation in which HPMC and/or a dextrin shown in Table 15 was added as an excipient was prepared under room temperature condition.

TABLE 15

| Material | Comparative Example 9 | Comparative Example 10 | Comparative Example 11 | Comparative Example 12 |
|---|---|---|---|---|
| CUR raw material (calculated In terms of curcumin) | 27.5 (25.1) | 27.5 (25.1) | 69 (62.9) | 100 (91.2) |

TABLE 15-continued

| Material | Comparative Example 9 | Comparative Example 10 | Comparative Example 11 | Comparative Example 12 |
|---|---|---|---|---|
| HPMC1* (METOLOSE SE-03) | 55 | | | |
| HPMC2 (METOLOSE SE-06) | | | | |
| HPMC3* (METOLOSE SE-50) | | 55 | 14 | |
| Dextrin NSD 300* | 17.5 | 17.5 | 17 | |
| Total (unit: %) | 100 | 100 | 100 | 100 |

The raw material indicated with * was added after only the CUR raw material was heated and kneaded, and mixed without heating.

(3) XRD Analysis of CUR-Containing Preparation

The XRD analysis results of the CUR-containing preparations prepared in the above (1) and (2) are shown in FIGS. 5 and 6. In each of the preparations of Comparative Examples 7 and 8 produced by the organic solvent method, the remaining crystal structure was observed immediately after production (initial stage), and the desired amorphous state was not formed (FIG. 5). In addition, when curcumin was melted and amorphized alone, the XRD analysis value became smaller according to the amount of the polysaccharide added after the amorphization (FIG. 6). However, even when the polysaccharide in an amount about three times the amount of curcumin was added, the XRD analysis value immediately after preparation was only 4.9% or 4.8% (Comparative Examples 9 and 10), and therefore, it is considered that in order to further increase the degree of amorphousness, it is important to add the polysaccharide (3) specified in the present invention at the time of heating and kneading.

Test Example 6

A solid composition in a powder form (Example 51) was prepared using the same formulation and production conditions as in Example 1' prepared in Test Example 1 except that the approximate heating time was changed to about 2 minutes. The XRD analysis value of the composition was 0% in the same manner as in Example 1' (FIG. 1-1).

Subsequently, in the solid composition (Example 51), a crystalline curcumin raw material (Table 3) was powder-mixed in a proportion shown in Table 16, and the obtained powder mixture (any of test samples 1 to 5) was subjected to an XRD analyzer under the above-mentioned conditions, and an XRD analysis value was determined from the chart. In Table 16, the total CUR content (%) contained in each of the powder mixtures (test samples 1 to 5), and a crystalline CUR content ratio (%) in the total CUR content (100%) are also shown.

TABLE 16

| Material (g) | Test sample 1 | Test sample 2 | Test sample 3 | Test sample 4 | Test sample 5 |
|---|---|---|---|---|---|
| (A) CUR amorphous preparation (Example 51) | 5.0 | 5.0 | 2.5 | 2.0 | 1.0 |
| (calculated in terms of amorphous CUR) | (1.0) | (1.0) | (0.5) | (0.4) | (0.2) |
| (B) CUR raw material* | 0.29 | 1.09 | 2.73 | 4.37 | 5.47 |
| (calculated in terms of crystalline CUR) | (0.26) | (1.00) | (2.49) | (3.99) | (4.99) |
| (C) Total of powder mixture (g) | 5.29 | 6.09 | 5.23 | 6.37 | 6.47 |
| Proportion in powder mixture (mass ratio) Amorphous CUR:Crystalline CUR | 1:0.26 | 1:1 | 1:5 | 1:10 | 1:25 |
| Total CUR content in powder mixture Calculated value (%) | 24 | 33 | 57 | 69 | 80 |
| (D) Content ratio (%) of crystalline CUR (in parentheses in column (B)) in powder mixture (C)) | 5 | 16 | 48 | 63 | 77 |
| (E) Content ratio (%) of crystalline CUR (in parentheses in column (B)) in total CUR content (sum in parentheses in columns (A) and (B)) | 20 | 50 | 83 | 91 | 96 |

*see Table 3

The XRD analysis charts of the test samples 1 to 5 and the XRD analysis values calculated from the charts are shown in FIG. 7-1. Further, a diagram obtained by plotting the content ratio (%) of the crystalline CUR (in parentheses in column (B)) in the powder mixture (C) (column (D) in Table 16) on the X axis and the XRD analysis value on the Y axis for each test sample is shown in FIG. 7-2. As shown in FIG. 7-2, it was confirmed that there is a favorable correlation between the crystalline CUR content ratio (%) in the powder mixture (C) and the XRD analysis value $\{(S2)/((S1)+(S2))\times100 (\%)\}$ ($R^2=0.9984$).

From this, it is considered that the proportion of a crystalline material (or the proportion of an amorphous material) of a poorly water-soluble material in a measurement sample can be determined by preparing a calibration curve as described above and also using the XRD analysis value of the measurement sample.

Further, a diagram obtained by plotting the content ratio (%) of the crystalline CUR (in parentheses in column (B)) in the total curcumin content (sum in parentheses in columns (A) and (B)) (column (E) in Table 16) on the X axis and the XRD analysis value on the Y axis for each test sample is shown in FIG. 7-3. As shown in FIG. 7-3, it was confirmed that there is a favorable correlation between the crystalline CUR content ratio (%) in the total CUR content and the XRD analysis value ($R^2=0.9907$).

From this, it is considered that the proportion of a crystalline material (or the proportion of an amorphous material) of a poorly water-soluble material in a measurement sample can be determined by preparing a calibration curve as described above and also using the XRD analysis value of the measurement sample.

The invention claimed is:

1. A method for producing a solid composition, comprising heating and kneading:
   a crystalline curcumin (1b);
   a hydroxypropylmethyl cellulose (2); and
   one or more polysaccharides (3) selected from the group consisting of gum arabic, hydroxypropyl cellulose, ghatti gum, processed starch, locust bean gum, guar gum, alginic acid or a salt thereof, carrageenan, pectin, xanthan gum, pullulan, microcrystalline cellulose, fermented cellulose, methyl cellulose, carboxymethyl cellulose, dextrin, cyclodextrin, soybean polysaccharide, agar, tamarind seed gum, guar gum decomposition product, karaya gum, tara gum, welan gum, and gellan gum,
   without using as a component any surfactant other than the components (1b), (2), and (3),
   by using a kneader,
   wherein the solid composition comprises:
   an amorphous curcumin (1a);
   the hydroxypropylmethyl cellulose (2); and
   the polysaccharide (3) that is one or more types selected from the group consisting of gum arabic, hydroxypropyl cellulose, ghatti gum, processed starch, locust bean gum, guar gum, alginic acid or a salt thereof, carrageenan, pectin, xanthan gum, pullulan, microcrystalline cellulose, fermented cellulose, methyl cellulose, carboxymethyl cellulose, dextrin, cyclodextrin, soybean polysaccharide, agar, tamarind seed gum, guar gum decomposition product, karaya gum, tara gum, welan gum, and gellan gum,
   wherein an XRD analysis value of the solid composition is 4.0% or less,
   provided that the XRD analysis value is a numerical value calculated according to the formula: $\{(S2)/((S1)+(S2))\}\times100$ (%) when an area of a halo peak in the range of 2θ=5 to 60° is represented by (S1) and an area of a sharp peak derived from a poorly water-soluble material in a crystalline state (1b) in a portion exceeding the halo peak is represented by (S2) in a chart obtained when the solid composition is analyzed with a powder X-ray diffractometer.

2. The method according to claim 1, wherein the heating and kneading is carried out under a temperature condition equal to or higher than a glass transition temperature Tg of the crystalline curcumin (1b).

3. The method according to claim 1, further comprising at least one selected from the group consisting of cooling, crushing or pulverizing, drying, granulation, and sizing the product of the heating and kneading.

4. The method according to claim 1, wherein the one or more polysaccharides (3) are a combination of hydroxypropyl cellulose and gum arabic.

* * * * *